United States Patent
Seo et al.

(10) Patent No.: US 10,506,567 B2
(45) Date of Patent: Dec. 10, 2019

(54) METHOD AND APPARATUS FOR TRANSMITTING AND RECEIVING UPLINK SIGNAL IN WIRELESS COMMUNICATION SYSTEM

(71) Applicant: LG ELECTRONICS INC., Seoul (KR)

(72) Inventors: Hanbyul Seo, Seoul (KR); Yunjung Yi, Seoul (KR); Suckchel Yang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/572,304

(22) PCT Filed: May 9, 2016

(86) PCT No.: PCT/KR2016/004810
§ 371 (c)(1),
(2) Date: Nov. 7, 2017

(87) PCT Pub. No.: WO2016/182287
PCT Pub. Date: Nov. 17, 2016

(65) Prior Publication Data
US 2018/0124775 A1     May 3, 2018

Related U.S. Application Data

(60) Provisional application No. 62/158,542, filed on May 8, 2015.

(51) Int. Cl.
*H04W 4/00* (2018.01)
*H04W 72/04* (2009.01)
(Continued)

(52) U.S. Cl.
CPC ....... *H04W 72/0413* (2013.01); *H04L 1/1671* (2013.01); *H04L 1/18* (2013.01);
(Continued)

(58) Field of Classification Search
USPC ................................. 370/329, 280, 281, 336
See application file for complete search history.

(56) References Cited

U.S. PATENT DOCUMENTS

2009/0046645 A1 * 2/2009 Bertrand .............. H04J 11/0069
370/329
2011/0188447 A1 * 8/2011 Wang .................... H04L 5/0053
370/328

(Continued)

FOREIGN PATENT DOCUMENTS

WO    WO 2015/046831 A1    4/2015

OTHER PUBLICATIONS

Interdigital, "On PUCCH for MTC UE", 3GPP TSG RAN WG1 Meeting #80bis, R1-152126, Belgrade, Serbia, Apr. 20-24, 2015, 6 pages.

(Continued)

*Primary Examiner* — Phuongchau Ba Nguyen
(74) *Attorney, Agent, or Firm* — Birch, Stewart, Kolasch & Birch, LLP

(57) ABSTRACT

The method for transmitting and receiving an uplink signal in a wireless communication system, according to one embodiment of the present invention, enables receiving, from a base station, information about an M-PUCCH resource for MTC, and transmitting, from a first subframe, the uplink signal through a first M-PUCCH resource on the basis of the M-PUCCH resource. Here, the index of the first M-PUCCH resource corresponds to a first index which is the index of the PUCCH resource of general UE in a first slot, and to a second index which is the index of the PUCCH (Continued)

resource of general UE in a second slot. The first index and the second index may be defined as the indexes of the resources positioned on a pair of the same physical resource blocks (PRBs).

8 Claims, 24 Drawing Sheets

(51) Int. Cl.
    *H04L 1/18*         (2006.01)
    *H04L 5/00*         (2006.01)
    *H04L 27/26*       (2006.01)
    *H04W 4/70*       (2018.01)
    *H04L 1/16*         (2006.01)

(52) U.S. Cl.
    CPC .............. *H04L 1/1861* (2013.01); *H04L 5/00* (2013.01); *H04L 5/0053* (2013.01); *H04L 27/26* (2013.01); *H04W 4/70* (2018.02); *H04W 72/042* (2013.01); *H04L 5/0044* (2013.01)

(56) References Cited

U.S. PATENT DOCUMENTS

2013/0094457 A1     4/2013   Seo et al.
2013/0322229 A1*  12/2013  Yoon ..................... H04L 5/0023
                                         370/208
2014/0198737 A1*  7/2014  Papasakellariou .... H04L 5/0055
                                         370/329

OTHER PUBLICATIONS

Media Tek Inc., "Discussion on PUCCH transmission for Rel-13 MTC", 3GPP TSG-RAN WG1 Meeting #80BIS, R1-152115, Belgrade, RS, Apr. 20-24, 2015, pp. 1-4.
NEC, "PUCCH for Rel-13 Low complexity MTC", 3GPP TSG RAN WG1 Meeting #80bis, R1-151558, Belgrade, Serbia, Apr. 20-24, 2015, pp. 1-3.

* cited by examiner

FIG. 20

| | first slot | second slot |
|---|---|---|
| 12 PUCCH resources on which CDM is performed in RB Y | 23 | 11 |
| | 22 | 10 |
| | 21 | 9 |
| | 20 | 8 |
| | 19 | 7 |
| | 18 | 6 |
| | 17 | 5 |
| | 16 | 4 |
| | 15 | 3 |
| | 14 | 2 |
| | 13 | 1 |
| | 12 | 0 |
| | ⋮ | ⋮ |
| 12 PUCCH resources on which CDM is performed in RB X | 11 | 23 |
| | 10 | 22 |
| | 9 | 21 |
| | 8 | 20 |
| | 7 | 19 |
| | 6 | 18 |
| | 5 | 17 |
| | 4 | 16 |
| | 3 | 15 |
| | 2 | 14 |
| | 1 | 13 |
| | 0 | 12 |

FIG. 21

| | first slot | second slot | |
|---|---|---|---|
| | 23 | 11 | → resource #23 used for LC-MTC PUCCH |
| | 22 | 10 | → resource #22 used for LC-MTC PUCCH |
| | 21 | 9 | → resource #21 used for LC-MTC PUCCH |
| | 20 | 8 | → resource #20 used for LC-MTC PUCCH |
| 12 PUCCH resources on which CDM is performed in RB Y | 19 | 7 | → resource #19 used for LC-MTC PUCCH |
| | 18 | 6 | → resource #18 used for LC-MTC PUCCH |
| | 17 | 5 | → resource #17 used for LC-MTC PUCCH |
| | 16 | 4 | → resource #16 used for LC-MTC PUCCH |
| | 15 | 3 | → resource #15 used for LC-MTC PUCCH |
| | 14 | 2 | → resource #14 used for LC-MTC PUCCH |
| | 13 | 1 | → resource #13 used for LC-MTC PUCCH |
| | 12 | 0 | → resource #12 used for LC-MTC PUCCH |
| | ⋮ | ⋮ | |
| | 11 | 23 | → resource #11 used for LC-MTC PUCCH |
| | 10 | 22 | → resource #10 used for LC-MTC PUCCH |
| | 9 | 21 | → resource #9 used for LC-MTC PUCCH |
| | 8 | 20 | → resource #8 used for LC-MTC PUCCH |
| 12 PUCCH resources on which CDM is performed in RB X | 7 | 19 | → resource #7 used for LC-MTC PUCCH |
| | 6 | 18 | → resource #6 used for LC-MTC PUCCH |
| | 5 | 17 | → resource #5 used for LC-MTC PUCCH |
| | 4 | 16 | → resource #4 used for LC-MTC PUCCH |
| | 3 | 15 | → resource #3 used for LC-MTC PUCCH |
| | 2 | 14 | → resource #2 used for LC-MTC PUCCH |
| | 1 | 13 | → resource #1 used for LC-MTC PUCCH |
| | 0 | 12 | → resource #0 used for LC-MTC PUCCH |

FIG. 22

|  | first slot | second slot |  |
|---|---|---|---|
| 12 PUCCH resources on which CDM is performed in RB Y | 23 | 11 | → resource #23 used for LC-MTC PUCCH |
| | 22 | 10 | → resource #21 used for LC-MTC PUCCH |
| | 21 | 9 | → resource #19 used for LC-MTC PUCCH |
| | 20 | 8 | → resource #17 used for LC-MTC PUCCH |
| | 19 | 7 | → resource #15 used for LC-MTC PUCCH |
| | 18 | 6 | → resource #13 used for LC-MTC PUCCH |
| | 17 | 5 | → resource #11 used for LC-MTC PUCCH |
| | 16 | 4 | → resource #9 used for LC-MTC PUCCH |
| | 15 | 3 | → resource #7 used for LC-MTC PUCCH |
| | 14 | 2 | → resource #5 used for LC-MTC PUCCH |
| | 13 | 1 | → resource #3 used for LC-MTC PUCCH |
| | 12 | 0 | → resource #1 used for LC-MTC PUCCH |
| | ⋮ | ⋮ | |
| 12 PUCCH resources on which CDM is performed in RB X | 11 | 23 | → resource #24 used for LC-MTC PUCCH |
| | 10 | 22 | → resource #22 used for LC-MTC PUCCH |
| | 9 | 21 | → resource #20 used for LC-MTC PUCCH |
| | 8 | 20 | → resource #18 used for LC-MTC PUCCH |
| | 7 | 19 | → resource #16 used for LC-MTC PUCCH |
| | 6 | 18 | → resource #14 used for LC-MTC PUCCH |
| | 5 | 17 | → resource #12 used for LC-MTC PUCCH |
| | 4 | 16 | → resource #8 used for LC-MTC PUCCH |
| | 3 | 15 | → resource #6 used for LC-MTC PUCCH |
| | 2 | 14 | → resource #4 used for LC-MTC PUCCH |
| | 1 | 13 | → resource #2 used for LC-MTC PUCCH |
| | 0 | 12 | → resource #0 used for LC-MTC PUCCH |

FIG. 23

| | first slot | second slot |
|---|---|---|
| one PRB | 2/2a/2b #1 (m=1) | 2/2a/2b #1 (m=0) |
| | 1/1a/1b #0 (m=3) | 2/2a/2b #2 (m=2) |
| | 1/1a/1b #2 (m=5) | 1/1a/1b #1 (m=4) |
| | ⋮ | ⋮ |
| | 1/1a/1b #1 (m=4) | 1/1a/1b #2 (m=5) |
| | 2/2a/2b #2 (m=2) | 1/1a/1b #0 (m=3) |
| one PRB | 2/2a/2b #0 (m=0) | 2/2a/2b #1 (m=1) |

METHOD AND APPARATUS FOR TRANSMITTING AND RECEIVING UPLINK SIGNAL IN WIRELESS COMMUNICATION SYSTEM

CROSS REFERENCE TO RELATED APPLICATIONS

This application is the National Phase of PCT International Application No. PCT/KR2016/004810, filed on May 9, 2016, which claims priority under 35 U.S.C. 119(e) to U.S. Provisional Application No. 62/158,542, filed on May 8, 2015, all of which are hereby expressly incorporated by reference into the present application.

TECHNICAL FIELD

The present invention relates to a wireless communication system, and more particularly, to a method of transmitting and receiving an uplink signal in a wireless communication system and an apparatus therefor.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE OF THE INVENTION

Technical Problem

An object of the present invention is to provide a method of transmitting and receiving an uplink signal in a wireless communication system and an apparatus therefor.

The technical problems solved by the present invention are not limited to the above technical problems and those skilled in the art may understand other technical problems from the following description.

Technical Solution

To achieve these and other advantages and in accordance with the purpose of the present invention, as embodied and broadly described, according to one embodiment, a method of transmitting an uplink signal, which is transmitted by a user equipment (UE) via a PUCCH (physical uplink control channel) in a wireless communication system supporting MTC (machine type communication), includes the steps of receiving information on an M-PUCCH resource for the MTC from a base station, and transmitting the uplink signal in a first subframe via a first M-PUCCH resource based on the M-PUCCH resource.

To further achieve these and other advantages and in accordance with the purpose of the present invention, according to a different embodiment, a method of receiving an uplink signal, which is transmitted by a base station via a PUCCH (physical uplink control channel) in a wireless communication system supporting MTC (machine type communication), includes the steps of transmitting information on an M-PUCCH resource for the MTC to a user equipment (UE), and receiving the uplink signal in a first subframe via a first M-PUCCH resource which is determined based on the M-PUCCH resource.

To further achieve these and other advantages and in accordance with the purpose of the present invention, according to a further different embodiment, a user equipment (UE) in a wireless communication system supporting MTC (machine type communication) includes a transceiver configured to transmit or receive a signal with a base station and a processor configured to control the transceiver, the processor configured to control the transceiver to receive information on an M-PUCCH resource for the MTC from a base station, the processor configured to control the transceiver to transmit the uplink signal in a first subframe via a first M-PUCCH resource based on the M-PUCCH resource.

To further achieve these and other advantages and in accordance with the purpose of the present invention, according to a further different embodiment, a base station in a wireless communication system supporting MTC (machine type communication) includes a transceiver configured to transmit or receive a signal with a user equipment and a processor configured to control the transceiver, the processor configured to control the transceiver to transmit information on an M-PUCCH resource for the MTC to the user equipment, the processor configured to control the transceiver to receive the uplink signal in a first subframe via a first M-PUCCH resource based on the M-PUCCH resource.

In the following, items described in the following can be commonly applied to each embodiment.

Preferably, the wireless communication system may correspond to a system supporting MTC (machine type communication).

And, an index of the first M-PUCCH resource may correspond to a first index corresponding to a PUCCH resource index of a normal UE in a first slot and a second index corresponding to a PUCCH resource index of a normal UE in a second slot and the first index and the second index may correspond to indexes of resources positioned at the same PRB (physical resource block) pair.

And, the second index of the first slot and an index of a second M-PUCCH resource corresponding to the first index of the second slot can be used to transmit an uplink signal of a different MTC UE.

Meanwhile, an uplink signal can be transmitted in a second subframe. In this case, an index of a third M-PUCCH resource may correspond to the second index of the first slot and the first index of the second slot in the second subframe.

And, the index of the first M-PUCCH resource can be configured to have a sequential value with a value of the index of the second M-PUCCH resource.

Preferably, the remaining resources except the first M-PUCCH resource can be configured for a normal UE in a PRB pair at which the first M-PUCCH resource is positioned.

And, the information on the M-PUCCH resource can be signaled via a higher layer signal.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, it is able to efficiently transmit and receive an uplink signal in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 20 is a diagram for explaining N-PUCCH and M-PUCCH resources in a subframe;

FIG. 21 illustrates an example of assigning a PUCCH resource index for M-PUCCH according to one embodiment of the present invention;

FIG. 22 illustrates a different example of assigning a PUCCH resource index for M-PUCCH according to one embodiment of the present invention;

FIG. 23 illustrates a further different example of assigning a PUCCH resource index for M-PUCCH according to one embodiment of the present invention;

BEST MODE

Mode for Invention

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

In a wireless communication system, a user equipment (UE) receives information from a base station (BS) on downlink (DL) and transmits information to the BS on uplink (UL). In LTE(-A), DL transmission is performed using OFDMA and uplink transmission is performed using single carrier frequency division multiple access (SC-FDMA).

Figure 1:
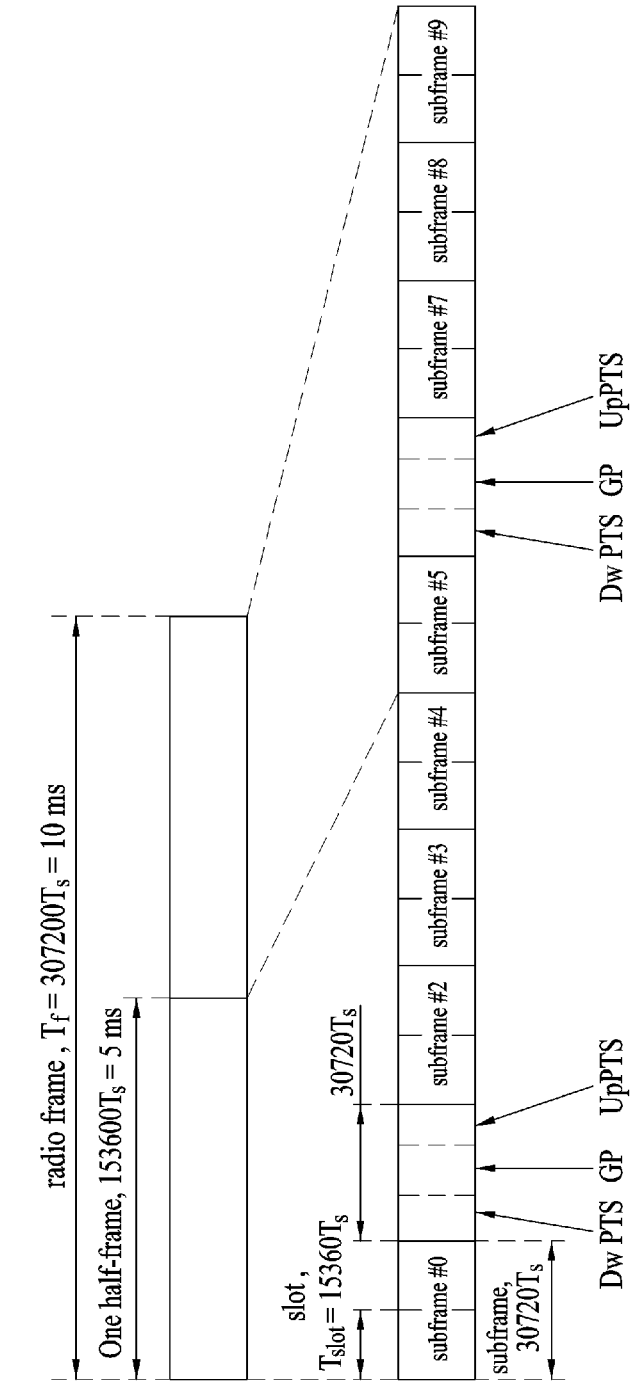
FIG. 1 illustrates a radio frame structure.

FIG. 1 illustrates a radio frame structure.

FIG. 1(a) illustrates a type-1 radio frame structure for frequency division duplex (FDD). A radio frame includes a plurality of (e.g. 10) subframes each of which includes a plurality of (e.g. 2) slots in the time domain. Each subframe has a duration of 1 ms and each slot has a duration of 0.5 ms. A slot includes a plurality of OFDM/SC-FDMA symbols in the time domain and includes a plurality of resource blocks (RBs) in the frequency domain.

FIG. 1(b) illustrates a type-2 radio frame structure for time division duplex (TDD). The type-2 radio frame includes 2 half frames. Each half frame includes 5 subframes each of which includes 2 slots.

Table 1 shows a UL-DL configuration (Uplink-Downlink Configuration, UL-DL Cfg or UD-cfg) of subframes in a radio frame in the TDD mode.

TABLE 1

| Uplink-downlink configuration | Downlink-to-Uplink Switch-point periodicity | Sub frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
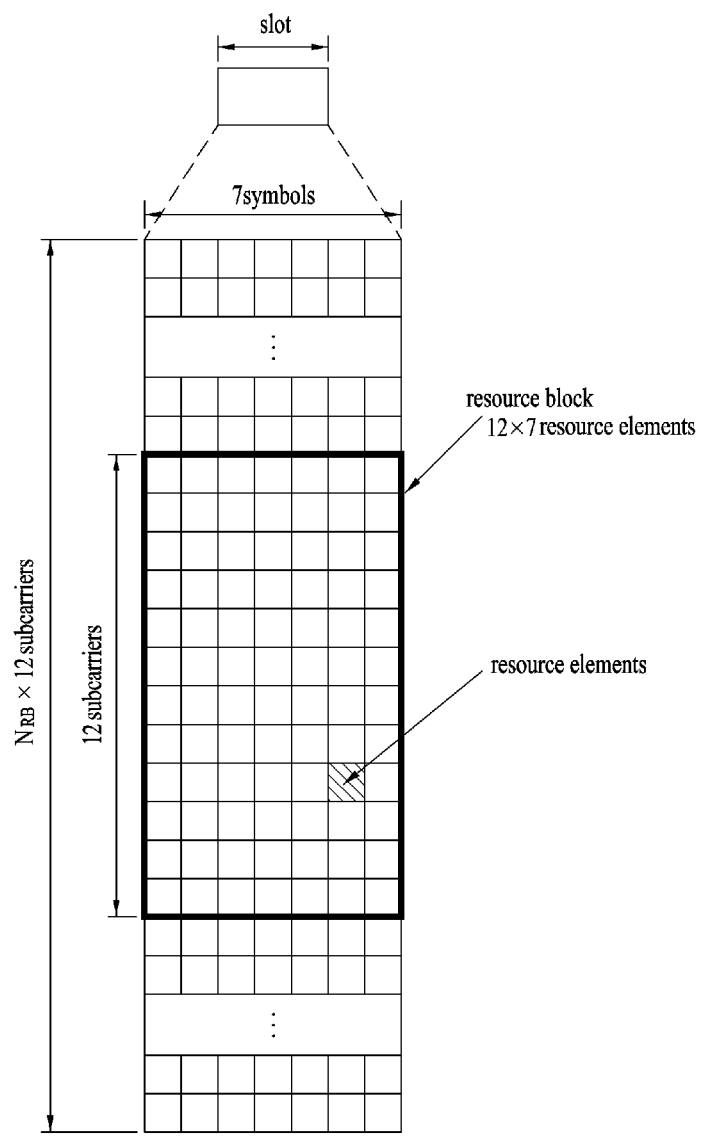
FIG. 2 illustrates a resource grid of a downlink slot.

FIG. 2 illustrates a resource grid of a DL slot.

Referring to FIG. 2, a DL slot includes a plurality of OFDMA (or OFDM) symbols in the time domain. One DL slot may include 7(6) OFDMA symbols according to cyclic prefix (CP) length, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of a UL slot may be same as that of the DL slot except that OFDMA symbols by replaced by SC-FDMA symbols.

Figure 3:
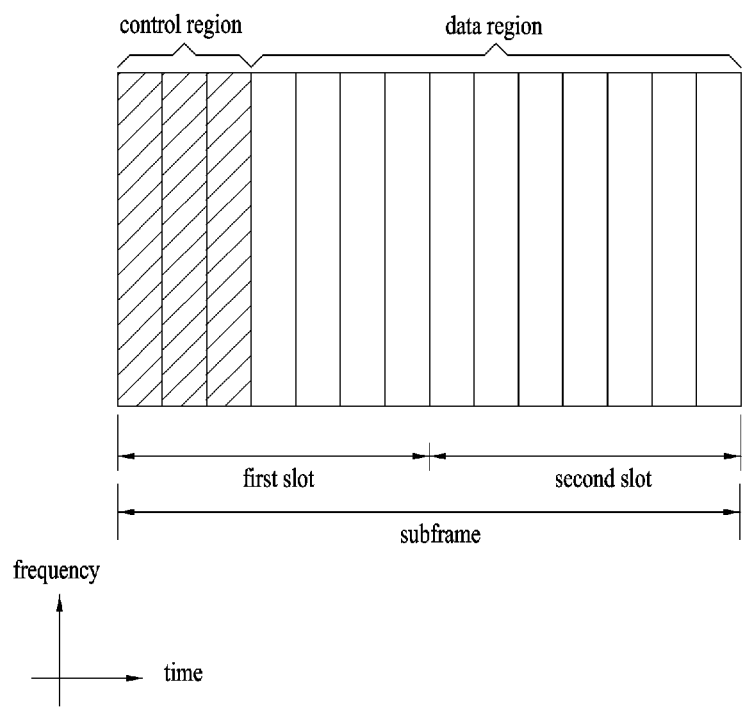
FIG. 3 illustrates a downlink subframe structure.

FIG. 3 illustrates a DL subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of DL control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ-ACK signal.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. Downlink control information (DCI) is transmitted through the PDCCH. DCI formats 0/4 (referred to as UL DCI formats hereinafter) for UL scheduling (or UL grant (UG)) and DCI formats 1/1A/1B/1C/1D/2/2A/2B/2C/2D (referred to as DL DCI formats) DL scheduling are defined. The DCI formats selectively include information such as hopping flag, RB allocation, MCS (Modulation Coding Scheme), RV (Redundancy Version), NDI (New Data Indicator), TPC (Transmit Power Control), DMRS (Demodulation Reference Signal) cyclic shift, etc. as necessary.

A plurality of PDCCHs can be transmitted within a control region. A UE monitors the plurality of PDCCHs per subframe in order to check a PDCCH destined therefor. The PDCCH is transmitted through one or more control channel elements (CCEs). A PDCCH coding rate may be controlled by the number of CCEs (i.e. CCE aggregation level) used for PDCCH transmission. A CCE includes a plurality of resource element groups (REGs). A format of the PDCCH and the number of PDCCH bits are determined by the number of CCEs. A BS determines a PDCCH format according to DCI to be transmitted to the UE, and attaches a cyclic redundancy check (CRC) to control information. The CRC is masked with an identifier (e.g. a radio network temporary identifier (RNTI)) according to an owner or usage of the PDCCH. If the PDCCH is for a specific UE, then an identifier (e.g., cell-RNTI (C-RNTI)) of the UE may be masked to the CRC. If the PDCCH is for a paging message, then a paging identifier (e.g., paging-RNTI (P-RNTI)) may be masked to the CRC. If the PDCCH is for system information (more specifically, a system information block (SIB)), then a system information RNTI (SI-RNTI) may be masked to the CRC. When the PDCCH is for a random access response, then a random access-RNTI (RA-RNTI) may be masked to the CRC.

A PDCCH carries a message known as DCI. In general, a plurality of PDCCHs is transmitted in a subframe. Each PDCCH is transmitted using one or more CCEs. Here, one CCE corresponds to 9 REGs and one REG corresponds to 4 REs. Four QPSK symbols are mapped to each REG. The REs occupied by a reference signal do not belong to the REG, and thus the number of REGs within a given OFDM symbol varies according to whether a cell-specific reference signal is present. The concept of REG can be applied to other downlink control channels (i.e., PCFICH and PHICH). Four PDCCH formats are supported as shown in Table 2.

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

The CCEs are sequentially numbered and consecutively used. To simplify a decoding process, a PDCCH having a format composed of n CCEs may start only at a CCE having a number corresponding to a multiple of n. The number of CCEs used to transmit a specific PDCCH is determined by a BS according to a channel state. For instance, in case of a PDCCH for a UE having a good DL channel (e.g., a UE adjacent to a BS), one CCE may be sufficient. However, in case of a PDCCH for a UE having a poor channel (e.g., a UE located at a cell boundary), 8 CCEs may be used to obtain sufficient robustness. In addition, a power level of the PDCCH may be adjusted based on the channel state.

In the LTE system, a CCE set in which a PDCCH can be located is defined for each UE. A CCE set in which the UE can detect its PDCCH is referred to as a PDCCH search space or simply as a search space (SS). An individual resource on which a PDCCH can be transmitted in the SS is referred to as a PDCCH candidate. One PDCCH candidate may correspond to 1, 2, 4, or 8 CCEs depending on the CCE aggregation level. The BS transmits an actual PDCCH (DCI) on a random PDCCH candidate in the SS and the UE monitors the SS to detect the PDCCH (DCI). Particularly, the UE attempts to perform blind decoding (BD) on PDCCH candidates in the SS.

In the LTE system, SSs for respective PDCCH formats may have different sizes. In particular, a dedicated SS (or, UE-specific SS (USS)) and a common SS (CSS) are defined. The USS is configured for each individual UE and information on a CSS range is provided to all UEs. At a given UE, the USS and CSS may overlap each other.

Since the SSs have relatively small sizes and they may overlap each other, the BS may be unable to find a CCE resource for transmitting the PDCCH to all of the preferred UEs in a given subframe. This is because, if the CCE resource is allocated for another UE, there may be no CCE resource for a specific UE in an SS of the corresponding UE (blocking). To minimize the possibility that the blocking is maintained until a next subframe, a UE-specific hopping sequence is applied to a starting point of the dedicated SS. Table 3 shows sizes of the USS and CSS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

Figure 4:
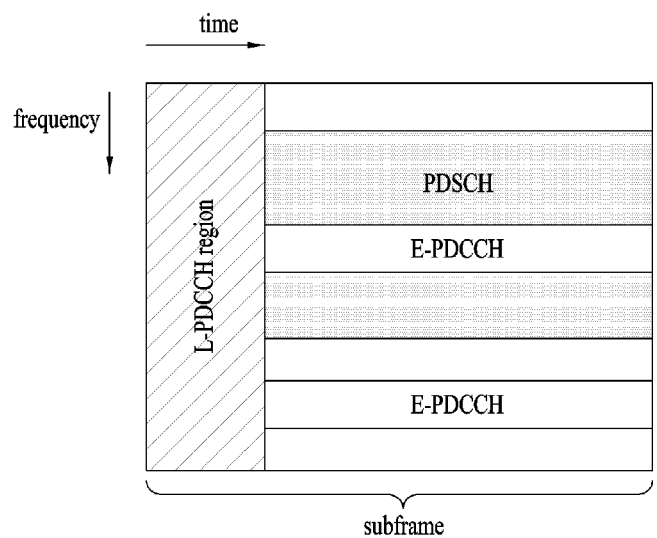
FIG. 4 illustrates an example of Enhanced Physical Downlink Control Channel (EPDCCH)

FIG. 4 illustrates an EPDCCH. The EPDCCH is a channel additionally introduced in LTE-A.

Referring to FIG. 4, a PDCCH (for convenience, legacy PDCCH or L-PDCCH) according to legacy LTE/LTE-A may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similar to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. Unless otherwise specified, the PDCCH in the present specification includes both of the L-PDCCH and EPDCCH.

Figure 5:
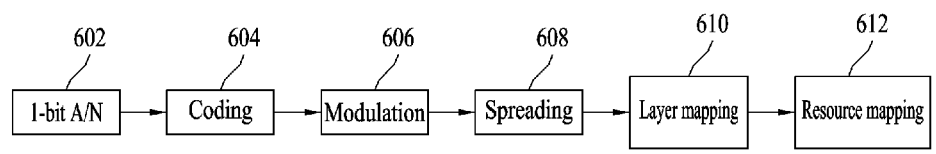
FIG. 5 illustrates a PHICH (Physical Hybrid ARQ Indicator Channel) signal processing process/block.

FIG. 5 illustrates a PHICH signal processing process/block.

Referring to FIG. 5, an A/N generation block 602 generates one piece of 1-bit A/N as a response to a PUSCH in case of MU-MIMO (multi-user multiple input multiple output) and generates two pieces of 1-bit A/N as a response to a PUSCH in case of SU-MIMO (single-user MIMO). Subsequently, (channel) coding 604 (e.g., ⅓ repetition coding), modulation 606 (e.g., BPSK (binary phase shift keying)), spreading 608, layer mapping 610, and resource mapping 612 are applied to the A/N bit for PHICH generation.

A plurality of PHICHs may be mapped to the same RE (e.g. REG) and then form a PHICH group. The REG is composed of four neighboring REs among the remaining REs except REs for a reference signal on one OFDM symbol. Each PHICH is identified by an orthogonal sequence (used in spreading) in the PHICH group. Accordingly, a PHICH resource is identified by an index pair $(n_{PHICH}^{group}, n_{PHICH}^{seq})$. Here, $n_{PHICH}^{group}$ represents a PHICH group number and $n_{PHICH}^{seq}$ represents an orthogonal sequence index. $n_{PHICH}^{group}$ and $n_{PHICH}^{seq}$ are checked using the lowest physical RB (PRB) index from among PRB indices allocated for PUSCH transmission and a cyclic shift of a DMRS transmitted through a UG.

Equation 1 represents an example of calculating $n_{PHICH}^{group}$ and $n_{PHICH}^{seq}$.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}$$

In Equation 1, $n_{DMRS}$ is mapped from a DMRS field value (i.e. cyclic shift) in a UG PDCCH signal which is most recently received in response to PUSCH transmission. $N_{SF}^{PHICH}$ represents the size of a spreading factor used for PHICH modulation. $N_{SF}^{PHICH}$ is 4 in case of normal CP and 2 in case of extended CP. $N_{PHICH}^{group}$ represents the number of PHICH groups. In the case of the first TB of the PUSCH, $I_{PRB\_RA}$ is $I_{PRB\_RA}^{lowest\_index}$. In the case of the second TB of the PUSCH, $I_{PRB\_RA}$ is $I_{PRB\_RA}^{lowest\_index}+1$. $I_{PRB\_RA}^{lowest\_index}$ denotes the lowest PRB index (of the first slot) in PUSCH transmission. For PUSCH transmission in a subframe n (where, n=4 or 9) in TDD UL-DL configuration #0, $I_{PHICH}$ is set to 1. In other case, it is set to 0.

In the case of FDD (frame structure type 1), the number of PHICH groups, $N_{PHICH}^{group}$, is identical in all subframes. In addition, $N_{PHICH}^{group}$ in each subframe is given by Equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad [\text{Equation 2}]$$

In Equation 2, $N_g \in \{1/6, 1/2, 1, 2\}$ is provided by a higher layer and $N^{DL}_{RB}$ represents the number of RBs of a DL band.

In the case of TDD (frame structure type 2), the number of PHICH groups may be changed in each DL subframe and is given by $m_i \cdot N_{PHICH}^{group}$. Table 4 shows $m_i$. For convenience, a PHICH resource (or the amount of PHICH resources) in case of $m_i=1$ is referred to as 1×PHICH resource and a PHICH resource (or the amount of PHICH resources) in case of $m_i=2$ is referred to as 2×PHICH resource.

TABLE 4

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Table 5 shows orthogonal sequences used in A/N bit spreading.

TABLE 5

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |

TABLE 5-continued

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 4 | [+j +j +j +j] | — |
| 5 | [+j −j +j −j] | — |
| 6 | [+j +j −j −j] | — |
| 7 | [+j −j −j +j] | — |

Figure 6:
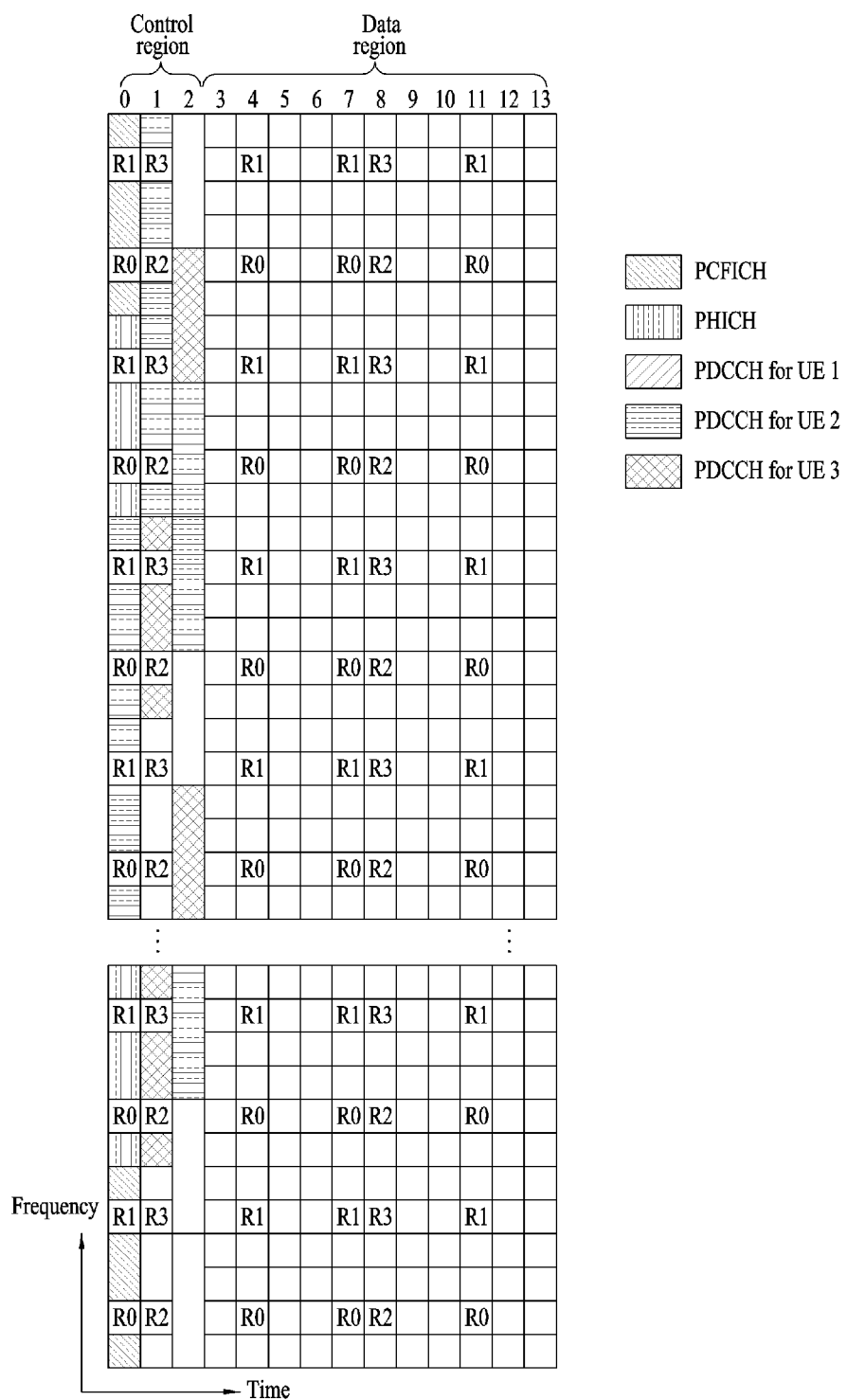
FIG. 6 illustrates a structure of a downlink physical channel.

FIG. 6 illustrates a structure of a downlink physical channel. In the drawing, R1 to R4 indicates CRSs (cell-specific reference signals) for antennas 0 to 3. Referring to FIG. 6, a control region includes a PCFICH, PHICH, and PDCCH. The basic resource of the downlink physical channel is an REG (resource element group). The REG is composed of four neighboring REs except an RS in an OFDMA symbol. The downlink physical channel is mapped to in an order of PCFICH>PHICH>PDCCH. That is, the PHICH is mapped to the rest of the REG except the PCFICH, and then the PDCCH is mapped to the remaining REG except the PCFICH/PHICH. Since PDCCH resources are changed according to PHICH resource, a UE should be aware of PHICH resource allocation information for PHCCH detection.

Figure 7:
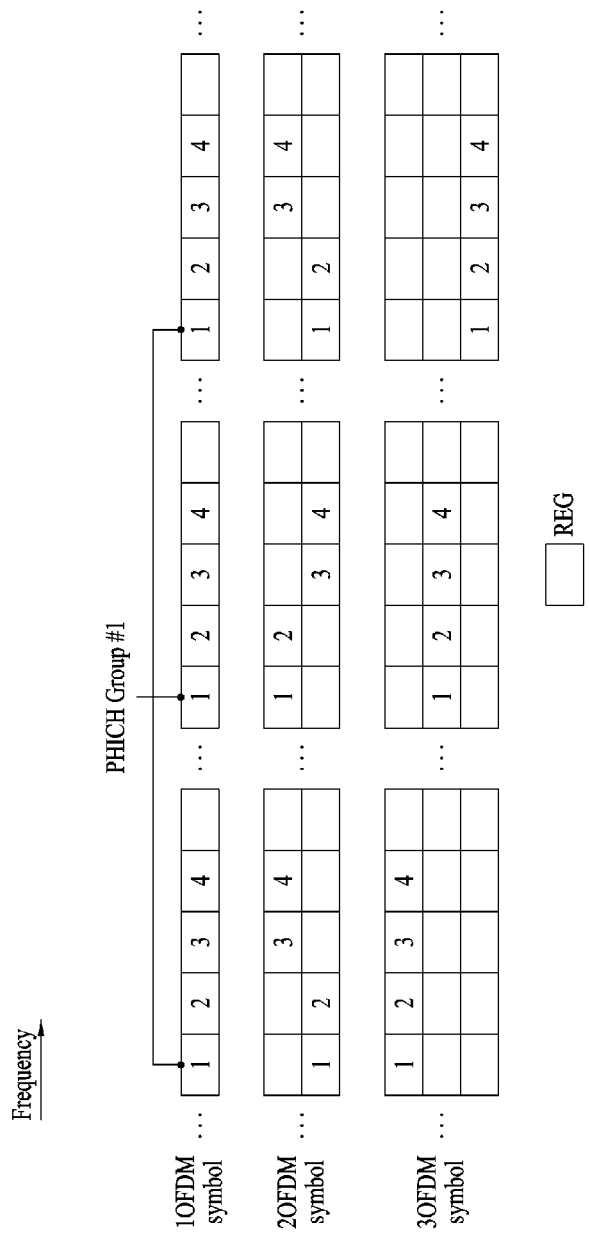
FIG. 7 illustrates an example of a PHICH group.

FIG. 7 illustrates an example of a PHICH group. Referring to FIG. 7, a PHICH group is transmitted using 3 REGs spaced as far apart as possible in the frequency domain. Consequently, each bit of an A/N codeword is transmitted through each REG. PHICH groups are consecutively allocated in the frequency domain. In the drawing, the same numeral denotes REGs belonging to the same PHICH group. A PHICH interval is limited by the size of the control region, and the number of OFDM symbols (PHICH interval) used for PHICH transmission corresponds to one to three OFDMA symbols. When a plurality of OFDMA symbols is used for the PHICH transmission, REGs belonging to the same PHICH group are transmitted using different OFDMA symbols.

Figure 8:
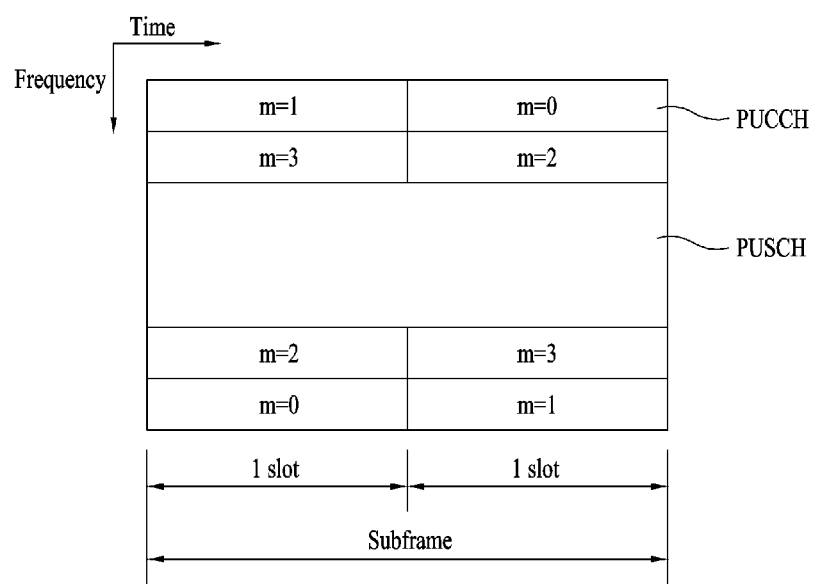
FIG. 8 illustrates the structure of an uplink subframe.

FIG. 8 illustrates a UL subframe structure.

Referring to FIG. 8, a UL subframe includes a plurality of (e.g. 2) slots. A slot may include different numbers of SC-FDMA symbols according to CP lengths. The UL subframe is divided into a control region and a data region in the frequency domain. The data region is used to carry a data signal such as audio data through a physical uplink shared channel (PUSCH). The control region is used to carry uplink control information (UCI) through a physical uplink control channel (PUCCH). The PUCCH includes an RB pair located at both ends of the data region in the frequency domain and hopped in a slot boundary.

The PUCCH can be used to transmit the following control information.

SR (scheduling request): This is information used to request a UL-SCH resource and is transmitted using On-Off Keying (OOK) scheme.

HARQ-ACK: This is an acknowledgement signal for a DL signal (e.g. a PDSCH or SPS release PDCCH). For example, a 1-bit ACK/NACK signal is transmitted as a response to a single DL codeword and a 2-bit ACK/NACK signal is transmitted as a response to two DL codewords.

CSI (channel state information): This is feedback information about a DL channel. The CSI includes a CQI (channel quality indicator), RI (rank indicator), PMI (precoding matrix indicator), PTI (precoding type indicator), etc.

An amount of UL control information (UCI) capable of being transmitted by a UE in a subframe depends on the number of SC-FDMA available for transmitting control information. The SC-FDMA available for transmitting the control information indicates remaining SC-FDMA symbols except SC-FDMA symbol used for transmitting a reference signal in the subframe. In case of a subframe to which an SRS (sounding reference signal) is set, a last SC-FDMA symbol of the subframe is also excluded from the available SC-FDMA. A reference signal is used for coherent detection of PUCCH. PUCCH supports various formats according to transmitted information.

Table 6 shows the mapping relationship between PUCCH formats and UCI in LTE(-A).

TABLE 6

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 6, PUCCH format 1 series are mainly used to transmit ACK/NACK information, PUCCH format 2 series are mainly used to carry channel state information (CSI) such as channel quality indicator (CQI)/precoding matrix indicator (PMI)/rank indicator (RI), and PUCCH format 3 series and PUCCH format 3 series are mainly used to transmit ACK/NACK information.

A UE is assigned PUCCH resources for UCI transmission by an eNB through higher-layer signaling, dynamic control signaling, or an implicit scheme. Physical resources used for PUCCHs depend on two parameters, $N^{(2)}_{RB}$ and $N^{(1)}_{CS}$, given by higher layers. The parameter $N^{(2)}_{RB}$, which is equal to or greater than 0 ($N^{(2)}_{RB} \geq 0$), indicates available bandwidth for PUCCH format 2/2a/2b transmission at each slot and is expressed as an integer multiple of $N^{RB}_{SC}$. The parameter $N^{(1)}_{CS}$ indicates the number of cyclic shifts used for PUCCH format 1/1a/1b in an RB used for a mixture of format 1/1a/1b and format 2/2a/2b. A value of $N^{(1)}_{CS}$ is an integer multiple of $\Delta^{PUCCH}_{shift}$ within a range of $\{0, 1, \ldots, 7\}$. $\Delta^{PUCCH}_{shift}$ is provided by higher layers. If $N^{(1)}_{CS}$ is 0, no mixed RBs are present. At each slot, at most one RB supports a mixture of PUCCH format 1/1a/1b and PUCCH format 2/2a/2b. Resources used for transmission of PUCCH format 1/1a/1b, PUCCH format 2/2a/2b, and PUCCH format 3 by antenna port p are expressed by $n^{(1,\tilde{p})}_{PUCCH}$, $n^{(2,\tilde{p})}_{PUCCH} < N^{(2)}_{RB} \cdot N^{RB}_{sc} + \text{ceil}(N^{(1)}_{cs}/8) \cdot (N^{RB}_{sc} - N^{(1)}_{cs} - 2)$, and $n^{(2,\tilde{p})}_{PUCCH}$, respectively, which are indexes of non-negative integer indexes.

More specifically, an orthogonal sequence and/or a cyclic shift to be applied to UCI are determined from PUCCH resource indexes according to a specific rule predefined for each PUCCH format, and resource indexes of two RBs in a subframe, to which a PUCCH is to be mapped, are provided. For example, a PRB for PUCCH transmission in a slot $n_s$ is given as follows.

$$n_{PRB} = \begin{cases} \lfloor \frac{m}{2} \rfloor & \text{if } (m + n_s \bmod 2) \bmod 2 = 0 \\ N^{UL}_{RB} - 1 - \lfloor \frac{m}{2} \rfloor & \text{if } (m + n_s \bmod 2) \bmod 2 = 1 \end{cases} \quad \text{\{Equation 3\}}$$

In Equation 3, m depends on a PUCCH format and is given as Equation 4, Equation 5, and Equation 6 for PUCCH format 1/1a/1b, PUCCH format 2/2a/2b, and PUCCH format 3, respectively.

$$m = \qquad \text{[Equation 4]}$$

$$\begin{cases} N^{(2)}_{RB} & \text{if } n^{(1,\tilde{p})}_{PUCCH} < c \cdot N^{(1)}_{cs}/\Delta^{PUCCH}_{shift} \\ \left\lfloor \frac{n^{(1,\tilde{p})}_{PUCCH} - c \cdot N^{(1)}_{cs}/\Delta^{PUCCH}_{shift}}{c \cdot N^{RB}_{sc}/\Delta^{PUCCH}_{shift}} \right\rfloor + \\ \qquad N^{(2)}_{RB} + \left\lceil \frac{N^{(1)}_{cs}}{8} \right\rceil & \text{otherwise} \end{cases}$$

$$c = \begin{cases} 3 & \text{normal cyclic prefix} \\ 2 & \text{extended cyclic prefix} \end{cases}$$

In Equation 4, $n^{(1,\tilde{p})}_{PUCCH}$ denotes a PUCCH resource index of an antenna port p for PUCCH format 1/1a/1b. In the case of an ACK/NACK PUCCH, $n^{(1,\tilde{p})}_{PUCCH}$ is a value implicitly determined by the first CCE index of a PDCCH carrying scheduling information of a corresponding PDSCH.

$$m = \lfloor n^{(2,\tilde{p})}_{PUCCH}/N^{RB}_{sc} \rfloor \qquad \text{[Equation 5]}$$

where $n^{(2)}_{PUCCH}$ denotes a PUCCH resource index of an antenna port p for PUCCH format 2/2a/2b and is a value transmitted to a UE from an eNB through higher-layer signaling.

$$m = \lfloor n^{(3,\tilde{p})}_{PUCCH}/N^{PUCCH}_{SF,0} \rfloor \qquad \text{[Equation 6]}$$

$n^{(3)}_{PUCCH}$ denotes a PUCCH resource index of an antenna port p for PUCCH format 3 and is a value transmitted to a UE from an eNB through higher-layer signaling. $N^{PUCCH}_{SF,0}$ indicates a spreading factor for the first slot of a subframe. For all of two slots of a subframe using normal PUCCH format 3, $N^{PUCCH}_{SF,0}$ is 5. For first and second slots of a subframe using a reduced PUCCH format 3, $N^{PUCCH}_{SF,0}$ is 5 and 4, respectively.

In 3GPP LTE/LTE-A system, a DL/UL subframe including a normal CP consists of 2 slots and each slot includes 7 OFDM symbols. A DL/UL subframe including an extended CP consists of 2 slots and each slot includes 6 OFDM symbols. Since the number of OFDM symbols included in a subframe varies according to a CP length, a structure of transmitting PUCCH in a UL subframe also varies according to the CP length. Hence, a method for a UE to transmit UCI in a UL subframe varies according to a PUCCH format and the CP length.

In case of transmitting control information using a PUCCH format 1a and 1b, control information of identical content is repeated in a subframe in a slot unit. Each UE transmits an ACK/NACK signal via resources different from each other consisting of a different CS (cyclic shift) of a CG-CAZAC (computer-generated constant amplitude zero auto correlation) and an OC (orthogonal cover) or an OCC (orthogonal cover code) (time domain spreading code). The orthogonal cover code may be named an orthogonal sequence. For instance, the OCC includes a Walsh/DFT (discrete Fourier Transform) orthogonal code. If the number of the CS corresponds to 6 and the number of the OCC corresponds to 3, total 18 PUCCHs can be multiplexed in an identical PRB (physical resource block) on the basis of a single antenna port. Orthogonal sequences $w_0$, $w_1$, $w_2$ and $w_3$ can be applied in random time domain after FFT (Fast Fourier Transform) modulation is performed or in random frequency domain (before the FFT modulation is performed). In 3GPP LTE/LTE-A system, a PUCCH resource for transmitting ACK/NACK is represented by a combination of a position of a time-frequency resource (e.g., PRB), cyclic shift of a sequence used for frequency spreading, and an orthogonal code (or quasi-orthogonal code) used for time spreading. Each PUCCH resource is indicated by a PUCCH resource index (also called a PUCCH index). A slot level structure of a PUCCH format 1 for transmitting an SR (scheduling request) is identical to a PUCCH format 1a and 1b. The PUCCH format 1 is different from the PUCCH format 1a/1b in a modulating scheme only.

In case of PUCCH format 2/2q/2b transmission of a normal CP, a UL subframe includes 10 OFDM symbols except a symbol carrying a UL reference signal (RS). Channel state information is coded into 10 transmission symbols (also called complex-valued modulation symbol) via block coding. The 10 transmission symbols are transmitted to an eNB in a manner of being respectively mapped to the 10 OFDM symbols.

The PUCCH format 1/1a/1b and the PUCCH format 2/2a/2b can carry UCI (uplink control information) within a prescribed number of bits only. Yet, as a carrier aggregation technique is applied, the number of antennas increases, and a TDD system, a relay system and a multi node system are introduced, an amount of UCI to be transmitted is increasing. As a result, a PUCCH format capable of carrying UCI greater than the amount of UCI capable of being transmitted by the PUCCH format 1/1a/1b/2/2a/2b is introduced. The PUCCH format corresponds to a PUCCH format 3. For instance, in case that a UE to which carrier aggregation is set transmits a plurality of ACKs/NACKs in response to a plurality of PDSCHs received from an eNB via a plurality of DL carriers, the UE can use the PUCCH format 3 in case of transmitting a plurality of the adjacent ACKs/NACKs via a specific UL carrier.

For instance, the PUCCH format 3 can be configured based on block-spreading. A block-spreading scheme transmits a symbol sequence in a manner of spreading the sequence in time domain using an OCC (or orthogonal sequence). According to the block-spreading scheme, control signals of many UEs can be transmitted to an eNB in a manner of being multiplexed to an identical RB by the OCC. In case of the PUCCH format 2, one symbol sequence is transmitted over time domain and UCIs of UEs are transmitted to an eNB in a manner of being multiplexed using a cyclic shift (CCS) of CAZAC sequence. On the contrary, in case of a block-spreading based new PUCCH format (hereinafter, PUCCH format 3), one symbol sequence is transmitted over frequency domain and UCIs of UEs are transmitted to an eNB in a manner of being multiplexed using OCC-based time domain spreading.

In the following description, a cyclic shift applied to all PUCCH formats is explained. All PUCCH formats use a cell-specific cyclic shift $n_{cs}^{cell}(n_s, l)$ which varies according to the following equation, together with a symbol number l and a slot number $n_s$.

$$n_{cs}^{cell}(n_s, l) = \Sigma_{i=0}^{7} c(8N_{symb}^{UL} \cdot n_s + 8l + i) \cdot 2^i \quad \text{[Equation 7]}$$

In this case, c(i) is a pseudo-random sequence, and is defined by a length-31 Gold sequence. An output sequence c(n) having a length of $M_{PN}$ (here, n=0, 1, . . . , $M_{PN}$-1) is defined by the following Equation. And, as shown in equation 9 in the following, the output sequence can be initializes whenever a radio frame starts.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2)) + x_2(n+1) + x_2(n)) \bmod 2 \quad \text{[Equation 8]}$$

$$c_{init} = N_{ID}^{cell} \quad \text{[Equation 9]}$$

In case of PUCCH format 1, information can be forwarded according to presence or non-presence of PUCCH transmission transmitted by a UE. The PUCCH format 1 assumes that a complex value symbol d(0) corresponds to 1. In case of PUCCH formats 1a and 1b, one or two explicit bits can be respectively transmitted. A block b(0), . . . , b($M_{bit}$-1) of the bits is modulated according to a table described in the following and becomes the complex value symbol d(0).

TABLE 7

| PUCCH format | b(0), . . . , b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

In case of each of the P number of antenna ports to be used for transmitting PUCCH, as shown in the following equation, if the complex value symbol d(0) is multiplied by a sequence $r_{u,v}^{(\alpha_{\tilde{p}})}(n)$ having a cyclic shift length $N_{seq}^{PUCCH}=12$, it may be able to generate a cyclic shifted complex value symbol sequence.

$$y^{(\tilde{p})}(n) = \frac{1}{\sqrt{P}} d(0) \cdot r_{u,v}^{(\alpha_{\tilde{p}})}(n), \quad \text{[Equation 10]}$$

$$n = 0, 1, \ldots, N_{seq}^{PUCCH} - 1$$

The $r_{u,v}^{(\alpha_{\tilde{p}})}(n)$ is identical to a case of $M_{sc}^{RS} = N_{seq}^{PUCCH}$ in the equation $r_{u,v}^{(\alpha)}(n) = e^{j\alpha n} \bar{r}_{u,v}(n)$, $0 \le n < M_{sc}^{RS}$ regarding a UL RS sequence $r_{u,v}^{(\alpha)}(n)$. An antenna-port specific cyclic shift $\alpha_{\tilde{p}}$ varies according to a symbol and a slot (i.e., a symbol number and a slot number) and can be determined by equation described in the following.

$$\alpha_{\tilde{p}}(n_s, l) = 2\pi \cdot \bar{n}_{cs}^{(\tilde{p})}(n_s, l)/N_{sc}^{RB} \quad \text{[Equation 11]}$$

$$\bar{n}_{cs}^{(\tilde{p})}(n_s, l) = \begin{cases} [n_{cs}^{cell}(n_s, l) + (n'_{\tilde{p}}(n_s) \cdot \Delta_{shift}^{PUCCH} + (\bar{n}_{oc}^{(\tilde{p})}(n_s) \bmod \Delta_{shift}^{PUCCH})) \bmod N'] \bmod N_{sc}^{RB} & \text{for normal cyclic prefix} \\ [n_{cs}^{cell}(n_s, l) + (n'_{\tilde{p}}(n_s) \cdot \Delta_{shift}^{PUCCH} + \bar{n}_{oc}^{(\tilde{p})}(n_s)) \bmod N'] \bmod N_{sc}^{RB} & \text{for extended cyclic prefix} \end{cases} \quad \text{[Equation 12]}$$

$$\bar{n}_{oc}^{(\tilde{p})}(n_s) = \begin{cases} \lfloor n'_{\tilde{p}}(n_s) \cdot \Delta_{shift}^{PUCCH}/N' \rfloor & \text{for normal cyclic prefix} \\ 2 \cdot \lfloor n'_{\tilde{p}}(n_s) \cdot \Delta_{shift}^{PUCCH}/N' \rfloor & \text{for extended cyclic prefix} \end{cases} \quad \text{[Equation 13]}$$

In this case, N' and c can be represented as equation 12 in the following.

$$N' = \begin{cases} N_{cs}^{(1)} & \text{if } n_{PUCCH}^{(1,\tilde{p})} < c \cdot N_{cs}^{(1)}/\Delta_{shift}^{PUCCH} \\ N_{sc}^{RB} & \text{otherwise} \end{cases} \quad \text{[Equation 14]}$$

$$c = \begin{cases} 3 & \text{normal cyclic prefix} \\ 2 & \text{extended cyclic prefix} \end{cases}$$

In this case, $\Delta_{shift}^{PUCCH}$ corresponds to a parameter provided by a higher layer.

A block $y^{(\tilde{p})}(0), \ldots, y^{(\tilde{p})}(N_{seq}^{PUCCH}-1)$ of the complex value symbol is scrambled by $S(n_s)$ and is block-wise spread by an antenna-port specific orthogonal sequence $w_{n_{oc}}^{(\tilde{p})}(i)$. A set of complex value symbols is generated by equation described in the following.

$$z^{(\tilde{p})}(m' \cdot N_{SF}^{PUCCH} \cdot N_{seq}^{PUCCH} + m \cdot N_{seq}^{PUCCH} + n) = S(n_s) \cdot w_{n_{oc}}^{(\tilde{p})}(m) \cdot y^{(\tilde{p})}(n) \quad \text{[Equation 15]}$$

In this case, it satisfies m=0, . . . , $N_{SF}^{PHICH}$-1, n=0, . . . , $N_{seq}^{PHICH}$-1, and m'=0,1 and the $S(n_s)$ can be represented by equation in the following.

$$S(n_s) = \begin{cases} 1 & \text{if } n'_{\tilde{p}}(n_s) \bmod 2 = 0 \\ e^{j\pi/2} & \text{otherwise} \end{cases} \quad \text{[Equation 16]}$$

$N_{SF}^{PUCCH}=4$ is applied to slots of both ends of a general PUCCH format 1/1a/1b, $N_{SF}^{PUCCH}=4$ is applied to a first slot of a PUCCH format 1/1a/1b, and $N_{SF}^{PUCCH}=3$ is applied to a second slot. An orthogonal sequence $w_{n_{oc}}^{(\tilde{p})}(i)$ varies according to a case of $N_{SF}^{PUCCH}=4$ (Table 8) and a case of $N_{SF}^{PUCCH}=3$ (Table 9), respectively.

TABLE 8

| Sequence index $n_{oc}^{(\tilde{p})}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 9

| Sequence index $n_{oc}^{(\tilde{p})}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Moreover, resources for transmitting PUCCH format 1, 1a, and 1b are identified by a resource index $n_{PUCCH}^{(1,\tilde{p})}$. In two slots of a subframe to which PUCCH is mapped, resource indexes of two resource blocks are given as equation described in the following. Equation 17 and equation 18 correspond to an even-numbered slot (i.e., $n_s$ mod 2=0) and an odd-numbered slot (i.e., $n_s$ mod 2=1), respectively.

$$n'_p(n_s) = \begin{cases} n_{PUCCH}^{(1,\tilde{p})} & \text{if } n_{PUCCH}^{(1,\tilde{p})} < c \cdot N_{cs}^{(1)}/\Delta_{shift}^{PUCCH} \\ (n_{PUCCH}^{(1,\tilde{p})} - c \cdot N_{cs}^{(1)}/\Delta_{shift}^{PUCCH}) \bmod (c \cdot N_{sc}^{RB}/\Delta_{shift}^{PUCCH}) & \text{otherwise} \end{cases}$$ [Equation 17]

$$n'_p(n_s) = \begin{cases} [c(n'_p(n_s - 1) + 1)] \bmod (cN_{sc}^{RB}/\Delta_{shift}^{PUCCH} + 1) - 1 & n_{PUCCH}^{(1,\tilde{p})} \geq c \cdot N_{cs}^{(1)}/\Delta_{shift}^{PUCCH} \\ \lfloor h_{\tilde{p}}/c \rfloor + (h_p \bmod c)N'/\Delta_{shift}^{PUCCH} & \text{otherwise} \end{cases}$$ [Equation 18]

In this case, $h_{\tilde{p}}=(n'_{\tilde{p}}(n_s−1)+d) \bmod (cN'/\Delta_{shift}^{PUCCH})$ is given. In case of a normal CP, d corresponds to 2. In case of an extended CP, d corresponds to 0.

In case of PUCCH formats 2, 2a and 2b, blocks b(0), . . . , b(19) of bits are scrambled by a UE-specific scrambling sequence to generate blocks $\tilde{b}$(0), . . . , $\tilde{b}$(19) of scrambled bits. The blocks can be represented as equation described in the following.

$$\tilde{b}(i)=(b(i)+c(i)) \bmod 2$$ [Equation 19]

In this case, a scrambling sequence, i.e., a pseudo-random sequence, corresponds to the aforementioned equation 2 and a generator of the scrambling sequence is initiated by $C_{init}$ described in the following whenever a subframe starts.

$$c_{init}=(\lfloor n_s/2 \rfloor+1) \cdot (2N_{ID}^{cell}+1) \cdot 2^{16}+n_{RNTI}$$ [Equation 20]

In this case, $n_{RNTI}$ corresponds to C-RNTI.

The blocks $\tilde{b}$(0), . . . , $\tilde{b}$(19) of the scrambled bits are modulated by QPSK to generate complex value modulation symbols d(0), . . . , d(9). Each of the P number of antenna ports is multiplied by a sequence $r_{u,v}^{(\alpha_{\tilde{p}})}(n)$ corresponding to a cyclic shift length $N_{seq}^{PUCCH}=12$ to transmit PUCCCH in the complex value modulation symbols d(0), . . . , d(9). As a result, it may be able to generate complex value symbols described in the following.

$$z^{(\tilde{p})}(N_{seq}^{PUCCH} \cdot n + i) = \frac{1}{\sqrt{P}} d(n) \cdot r_{u,v}^{(\alpha_{\tilde{p}})}(i)$$ [Equation 21]

$n = 0, 1, \ldots, 9$ $i = 0, 1, \ldots, N_{sc}^{RB} - 1$

The $r_{u,v}^{(\alpha_{\tilde{p}})}(i)$ is identical to a case of $M_{sc}^{RS}=N_{seq}^{PUCCH}$ mentioned earlier in the equation 5.

Meanwhile, resources for transmitting PUCCH formats 2, 2a, and 2b are identified by a resource index $n_{PUCCH}^{(2,\tilde{p})}$ that determines the cyclic shift $\alpha_{\tilde{p}}(n_s,l)$. It can be represented by equation described in the following.

$$\alpha_{\tilde{p}}(n_s,l)=2\pi \cdot n_{cs}^{(\tilde{p})}(n_s,l)/N_{sc}^{RB}$$ [Equation 22]

The $n_{cs}^{(\tilde{p})}(n_s,l)$ can be represented by equation described in the following and $N_{sc}^{RB}$ corresponds to a resource block size, i.e., the number of subcarriers in a resource block.

$$n_{cs}^{(\tilde{p})}(n_s,l)=(n_{cs}^{cell}(n_s,l)+n_{\tilde{p}}'(n_s)) \bmod N_{sc}^{RB}$$ [Equation 23]

In this case, the $n_{\tilde{p}}'(n_s)$ varies according to a slot. In case of an even-numbered slot, the $n_{\tilde{p}}'(n_s)$ can be represented as follows.

$$n'_{\tilde{p}}(n_s) = \begin{cases} n_{PUCCH}^{(2,\tilde{p})} \bmod N_{sc}^{RB} & \text{if } n_{PUCCH}^{(2,\tilde{p})} < N_{sc}^{RB} N_{RB}^{(2)} \\ (n_{PUCCH}^{(2,\tilde{p})} + N_{cs}^{(1)} + 1) \bmod N_{sc}^{RB} & \text{otherwise} \end{cases}$$ [Equation 24]

In case of an odd-numbered slot, the $n_{\tilde{p}}'(n_s)$ can be represented as follows.

$$n'_{\tilde{p}}(n_s) = \begin{cases} [N_{sc}^{RB}(n'_{\tilde{p}}(n_s-1)+1)] \bmod \\ \quad (N_{sc}^{RB}+1) - 1 & \text{if } n_{PUCCH}^{(2,\tilde{p})} < N_{sc}^{RB} N_{RB}^{(2)} \\ (N_{sc}^{RB} - 2 - n_{PUCCH}^{(2,\tilde{p})}) \bmod N_{sc}^{RB} & \text{otherwise} \end{cases}$$ [Equation 25]

UCI information bits b(20), . . . , b($M_{bit}$−1) are modulated for PUCCH format 2a and 2b, which are supported for a normal CP only, and become a single modulation symbol d(10) used for generating a reference signal for the PUCCH formats 2a and 2b.

TABLE 10

| PUCCH format | b(20), . . . , b($M_{bit}$ − 1) | d(10) |
|---|---|---|
| 2a | ☐ | 1 |
| | ☐ | −1 |
| ☐2b ☐ | ☐☐ | 1 |
| | ☐☐ | −j |
| | ☐☐ | j |
| | ☐☐ | −1 |

In the following, PUCCH format 3 is explained. If slot-level frequency hopping is not performed, it may increase multiplexing capacity as much as twice by additionally performing spreading or covering (e.g., Walsh covering) in a slot unit. When the slot-level frequency hopping is performed, if the Walsh covering is applied in a slot unit, orthogonality can be broken due to a difference of a channel condition experienced by each slot. A slot unit spread code (e.g., orthogonal code cover) for an RS includes Walsh cover of [x1 x2]=[1 1],[1 −1] or a linearly converted form of the Walsh cover (e.g., [j j] [j −j], [1 j] [1−j]), by which the present invention may be non-limited. x1 is applied to a first slot and x2 is applied to a second slot. Referring to the drawing, although it is depicted as spreading (or covering) is performed in an SC-FDMA symbol level after spreading (or covering) of a slot level is performed, the order of performing the spreading can be changed.

A signal processing procedure of the PUCCH format 3 is explained using equation. For clarity, assume that a length-5 OCC is used.

First of all, bit blocks $b(0), \ldots, b(M_{bit}-1)$ are scrambled by a UE-specific scrambling sequence. The bit blocks $b(0), \ldots, b(M_{bit}-1)$ may correspond to coding bits $b\_0, b\_1, \ldots, b\_N-1$. The bit blocks $b(0), \ldots, b(M_{bit}-1)$ include at least one selected from the group consisting of an ACK/NACK bit, a CSI bit, and an SR bit. The scrambled bit blocks $\tilde{b}(0), \ldots, \tilde{b}(M_{bit}-1)$ can be generated by equation described in the following.

$$\tilde{b}(i)=(b(i)+c(i)) \bmod 2 \qquad \text{[Equation 26]}$$

In this case, c(i) corresponds to a scrambling sequence mentioned earlier in equation 2. The c(i) includes a pseudo-random sequence defined by a length-31 gold sequence and can be generated by equation described in the following. mod denotes modulo calculation.

The scrambled bit blocks $\tilde{b}(0), \ldots, \tilde{b}(M_{bit}-1)$ are modulated to generate complex modulation symbol blocks $d(0), \ldots, d(M_{symb}-1)$. If QPSK modulation is performed, it may have $M_{symb}=M_{bit}/2=2N_{sc}^{RB}$.

The complex modulation symbol blocks $d(0), \ldots, d(M_{symb}-1)$ are block-wise spread using orthogonal sequences $w_{n_{oc,0}}^{(\tilde{p})}(i)$ and $w_{n_{oc,1}}^{(\tilde{p})}(i)$. It may generate $N_{SF,0}^{PUCCH}+N_{SF,1}^{PUCCH}$ number of complex value symbols sets using equation described in the following. A distributing/spreading procedure is performed using the equation described in the following. Each of the complex value symbol sets corresponds to a single SC-FDMA symbol and has $N_{sc}^{RB}$ number of complex value modulation values (e.g., 12).

$$y_n^{(\tilde{p})}(i) = \qquad \text{[Equation 27]}$$

$$\begin{cases} w_{n_{oc,0}^{(\tilde{p})}}(\bar{n}) \cdot e^{j\pi \lfloor n_{cs}^{cell}(n_s,l)/64 \rfloor/2} \cdot d(i) & n < N_{SF,0}^{PUCCH} \\ w_{n_{oc,1}^{(\tilde{p})}}(\bar{n}) \cdot e^{j\pi \lfloor n_{cs}^{cell}(n_s,l)/64 \rfloor/2} \cdot d(N_{sc}^{RB}+i) & \text{otherwise} \end{cases}$$

$$\bar{n} = n \bmod N_{SF,0}^{PUCCH}$$

$$n = 0, \ldots, N_{SF,0}^{PUCCH} + N_{SF,1}^{PUCCH} - 1$$

$$i = 0, 1, \ldots, N_{sc}^{RB} - 1$$

In this case, $N_{SF,0}^{PUCCH}$ and $N_{SF,1}^{PUCCH}$ correspond to the number of SC-FDMA symbols for transmitting PUCCH in a slot 0 and a slot 1, respectively. In case of using a general PUCCH format 3, the $N_{SF,0}^{PUCCH}$ and $N_{SF,1}^{PUCCH}$ correspond to 5. In case of using a shortened PUCCH format 3, the $N_{SF,0}^{PUCCH}$ corresponds to 5 and the $N_{SF,1}^{PUCCH}$ corresponds to 4. $w_{n_{oc,0}}^{(\tilde{p})}(i)$ and $w_{n_{oc,1}}^{(\tilde{p})}(i)$ correspond to orthogonal sequences applied to a slot 0 and a slot 1, respectively, and are provided by table 12 in the following. $n_{oc}$ corresponds to an orthogonal sequence index (or orthogonal code index). $\lfloor \; \rfloor$ denotes a flooring function. $n_{cs}^{cell}(n_s,l)$ is explained in equation 8.

Table 11 shows a sequence index $n_{oc}$ and an orthogonal sequence $w_{n_{oc}}(i)$

TABLE 11

| Sequence index $n_{oc}$ | Orthogonal sequences $[w_{n_{oc}}(0) \ldots w_{n_{oc}}(N_{SF}^{PUCCH}-1)]$ | |
|---|---|---|
| | $N_{SF}^{PUCCH}=5$ | $N_{SF}^{PUCCH}=4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 −1 −1 +1] |
| 3 | [1 $e^{j6\pi/5}$ $e^{j2\pi/5}$ $e^{j8\pi/5}$ $e^{j4\pi/5}$] | [+1 +1 −1 −1] |
| 4 | [1 $e^{j8\pi/5}$ $e^{j6\pi/5}$ $e^{j4\pi/5}$ $e^{j2\pi/5}$] | — |

Meanwhile, a resource for performing PUCCH format 3 is identified by a resource index $n_{PUCCH}^{(3)}$. For example, $n_{oc}$ can be provided by $n_{oc}=n_{PUCCH}^{(3)} \bmod N_{SF,1}^{PUCCH}$. The $n_{PUCCH}^{(3)}$ can be indicated by a TPC (transmit power control) field of Scell PDCCH. More specifically, $n_{oc}$ for each slot can be given by equation described in the following.

$$n_{oc,0}^{(\tilde{p})} = n_{PUCCH}^{(3,\tilde{p})} \bmod N_{SF,1}^{PUCCH} \qquad \text{[Equation 28]}$$

$$n_{oc,1}^{(\tilde{p})} = \begin{cases} (3n_{oc,0}^{(\tilde{p})}) \bmod N_{SF,1}^{PUCCH} & \text{if } N_{SF,1}^{PUCCH}=5 \\ n_{oc,0}^{(\tilde{p})} \bmod N_{SF,1}^{PUCCH} & \text{otherwise} \end{cases}$$

In this case, $n_{oc,0}^{(\tilde{p})}$ corresponds to a sequence index value $(n_{oc})$ for a slot 0 and $n_{oc,1}^{(\tilde{p})}$ corresponds to a sequence index value $(n_{oc})$ for a slot 1. In case of using a general PUCCH format 3, $N_{SF,0}^{PUCCH}$ and $N_{SF,1}^{PUCCH}$ correspond to 5. In case of using a shortened PUCCH format 3, the $N_{SF,0}^{PUCCH}$ corresponds to 5 and the $N_{SF,1}^{PUCCH}$ corresponds to 4.

And, cyclic shift can be performed on a block-wise spread complex symbol set according to equation described in the following.

$$\tilde{y}_n^{(\tilde{p})}(i) = y_n^{(\tilde{p})}((i+n_{cs}^{cell}(n_s,l)) \bmod N_{sc}^{RB}) \qquad \text{[Equation 29]}$$

In this case, $n_s$ denotes a slot number in a radio frame and l denotes an SC0FDMA symbol number in a slot. $n_{cs}^{cell}(n_s,l)$ is defined in equation 17. $n=0, \ldots, N_{SF,0}^{PUCCH}+N_{SF,1}^{PUCCH}-1$ Transform precoding is performed on each of the cyclic shifted complex value symbol set according to equation described in the following. As a result, complex value symbol blocks $z(0), \ldots, ((N_{SF,0}^{PUCCH}+N_{SF,1}^{PUCCH})N_{sc}^{RB}-1$ are generated.

$$z^{(\tilde{p})}(n \cdot N_{sc}^{RB} + k) = \frac{1}{\sqrt{P}} \frac{1}{\sqrt{N_{sc}^{RB}}} \sum_{i=0}^{N_{sc}^{RB}-1} \tilde{y}_n^{(\tilde{p})}(i) e^{-j\frac{2\pi i k}{N_{sc}^{RB}}} \qquad \text{[Equation 30]}$$

$$k = 0, \ldots, N_{sc}^{RB} - 1$$

$$n = 0, \ldots, N_{SF,0}^{PUCCH} + N_{SF,1}^{PUCCH} - 1$$

In this case, P corresponds to the number of antenna ports used for transmitting PUCCH. The complex value symbol blocks z=(0), . . . , z ((N$_{SF,0}^{PUCCH}$+N$_{SF,1}^{PUCCH}$)N$_{sc}^{RB}$−1) are mapped to a physical resource after power control. PUCCH uses a single resource block in each slot of a subframe. The z=(0), . . . , z ((N$_{SF,0}^{PUCCH}$+N$_{SF,1}^{PUCCH}$) N$_{sc}^{RB}$−1) are mapped to a resource element (k,l) which is not used for transmitting an RS in the resource block. Mapping is performed from a first slot of a subframe in an ascending order of a slot number. K denotes a subcarrier index and l denotes an SC-FDMA symbol index in a slot.

Figure 9:
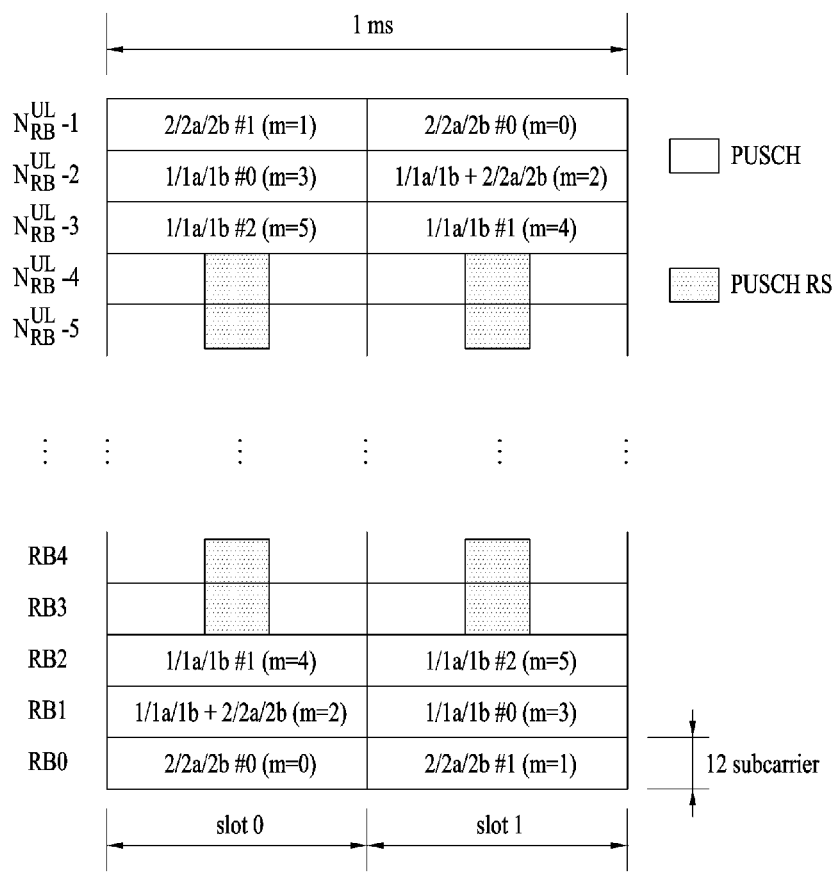
FIG. 9 illustrates an example of physically mapping a PUCCH format to a PUCCH region.

FIG. 9 illustrates an example of physically mapping PUCCH formats to PUCCH regions.

Referring to FIG. 9, the PUCCH formats are mapped to RBs in the order of PUCCH formats 2/2a/2b (CQI) (e.g. PUCCH region m=0, 1), PUCCH formats 2/2a/2b (CQI) or PUCCH formats 1/1a/1b (SR/HARQ ACK/NACK) (e.g. PUCCH region m=2 if present) and PUCCH formats 1/1a/1b (SR/HARQ ACK/NAKC) (e.g. PUCCH region m=3, 4, 5) from the band edge to the inside and transmitted. The number N$_{RB}^{(2)}$ of PUCCH RBs that can be used for PUCCH format 2/2a/2b (CQI) is signaled to the UE through broadcast signaling in the cell.

Figure 10:
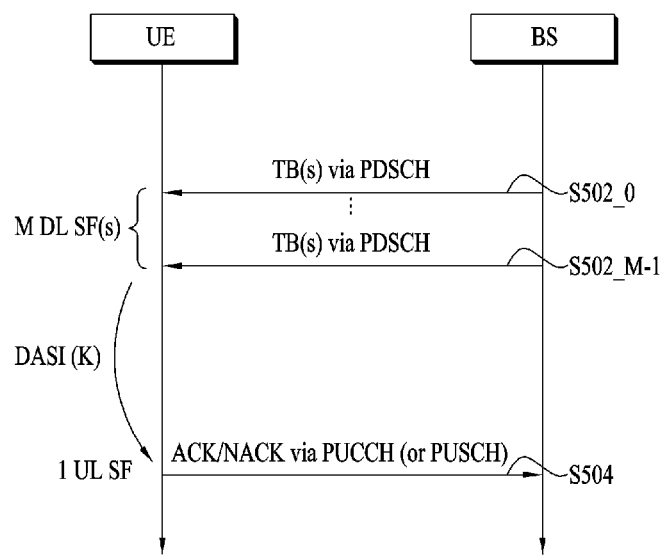
FIGS. 10 and 11 illustrate an ACK/NACK (A/N) timing (or an HARQ timing)
Figure 11:
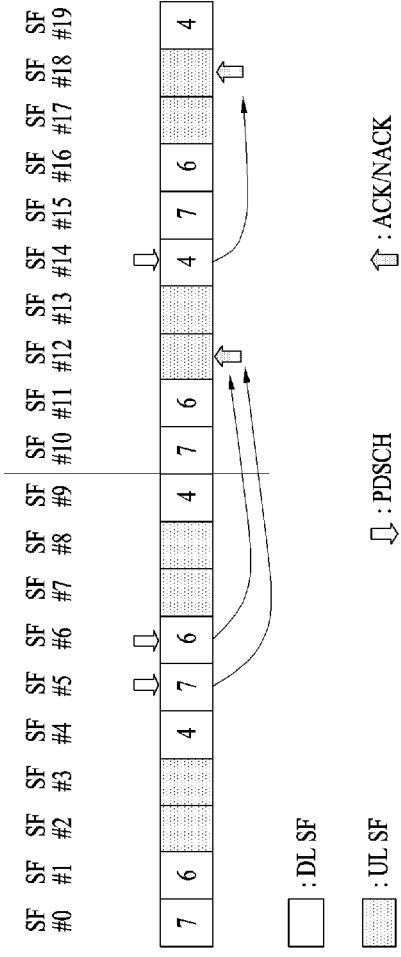

FIGS. 10 and 11 illustrate an ACK/NACK (A/N) timing (or an HARQ timing).

Referring to FIG. 10, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 4 can be used for ACK/NACK transmission. To reduce the number of ACK/NACK bits transmitted through a PUCCH format, various methods such as ACK/NACK bundling and ACK/NACK channel selection can be used.

In the FDD, M=1 and in the TDD, M is an integer greater than 1. In the case of the TDD, a relationship between M of DL subframes and UL subframes in which the A/N signal is transmitted is determined by DASI (downlink association set index).

Table 12 shows DASI (K:{k$_0$, k$_1$, . . . k$_{M-1}$}) defined in LTE(-A). When a PDCCH that indicates PDSCH transmission and/or SPS (semi-persistent scheduling) release is present in a subframe n−k (where k∈K), a UE transmits ACK/NACK in a subframe n. In the FDD, DASI (for convenience, referred to as d$_F$) is set to 4.

TABLE 12

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD operation, a UE needs to transmit A/N signals for at least one DL transmission (e.g., PDSCH), which is received through M DL SFs, through one UL SF. A description will be given of schemes for transmitting A/N for a plurality of DL SFs through one UL SF.

1) A/N bundling: A/N bits for a plurality of data units (e.g. PDSCH, SPS release PDCCH, etc.) are combined through a logical operation (e.g. logic-AND operation). For example, when successfully decoding all data units, a receiving end (e.g. UE) transmits an ACK signal. On the contrary, when failing to decode any one of the data units, the receiving end transmits a NACK signal or no signal.

2) Channel selection (CHsel): When receiving a plurality of data units (e.g. PDSCH, SPS release PDCCH, etc.), a UE occupies a plurality of PUCCH resources for A/N transmission. A/N responses to the plurality of the data units are identified by combinations of the PUCCH resources used for the A/N transmission and transmitted A/N contents (e.g. bit values and QPSK symbol values). The channel selection is also referred to as A/N selection and PUCCH selection.

Table 13 shows a PUCCH selection transmission scheme defined in the LTE system (where M=4).

TABLE 13

| HARQ-ACK(0), HARQ-ACK(1), HARQ-ACK(2), HARQ-ACK(3) | Subframe n$^{(1)}_{PUCCH,X}$ | b(0), b(1) |
|---|---|---|
| ACK, ACK, ACK, ACK | n$^{(1)}_{PUCCH,1}$ | 1, 1 |
| ACK, ACK, ACK, NACK/DTX | n$^{(1)}_{PUCCH,1}$ | 1, 0 |
| NACK/DTX, NACK/DTX, NACK, DTX | n$^{(1)}_{PUCCH,2}$ | 1, 1 |
| ACK, ACK, NACK/DTX, ACK | n$^{(1)}_{PUCCH,1}$ | 1, 0 |
| NACK, DTX, DTX, DTX | n$^{(1)}_{PUCCH,0}$ | 1, 0 |
| ACK, ACK, NACK/DTX, NACK/DTX | n$^{(1)}_{PUCCH,1}$ | 1, 0 |
| ACK, NACK/DTX, ACK, ACK | n$^{(1)}_{PUCCH,3}$ | 0, 1 |
| NACK/DTX, NACK/DTX, NACK/DTX, NACK | n$^{(1)}_{PUCCH,3}$ | 1, 1 |
| ACK, NACK/DTX, ACK, NACK/DTX | n$^{(1)}_{PUCCH,2}$ | 0, 1 |
| ACK, NACK/DTX, NACK/DTX, ACK | n$^{(1)}_{PUCCH,0}$ | 0, 1 |
| ACK, NACK/DTX, NACK/DTX, NACK/DTX | n$^{(1)}_{PUCCH,0}$ | 1, 1 |
| NACK/DTX, ACK, ACK, ACK | n$^{(1)}_{PUCCH,3}$ | 0, 1 |
| NACK/DTX, NACK, DTX, DTX | n$^{(1)}_{PUCCH,1}$ | 0, 0 |
| NACK/DTX, ACK, ACK, NACK/DTX | n$^{(1)}_{PUCCH,2}$ | 1, 0 |
| NACK/DTX, ACK, NACK/DTX, ACK | n$^{(1)}_{PUCCH,3}$ | 1, 0 |
| NACK/DTX, ACK, NACK/DTX, NACK/DTX | n$^{(1)}_{PUCCH,1}$ | 0, 1 |
| NACK/DTX, NACK/DTX, ACK, ACK | n$^{(1)}_{PUCCH,3}$ | 0, 1 |
| NACK/DTX, NACK/DTX, ACK, NACK/DTX | n$^{(1)}_{PUCCH,2}$ | 0, 0 |
| NACK/DTX, NACK/DTX, NACK/DTX, ACK | n$^{(1)}_{PUCCH,3}$ | 0, 0 |
| DTX, DTX, DTX, DTX | N/A | N/A |

In Table 13, HARQ-ACK(i) indicates an HARQ ACK/NACK/DTX result for an i-th data unit (where, 0≤i≤3). The HARQ ACK/NACK/DTX result means ACK, NACK, DTX (discontinuous transmission) or NACK/DTX. The DTX means that there is no transmission of a data unit corresponding to HARQ-ACK(i) or a UE fails to detect presence of the data unit corresponding to HARQ-ACK(i). Maximum four PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 13, $n^{(1)}_{PUCCH,X}$ indicates a PUCCH resource used in ACK/NACK transmission. In addition, b(0)b(1) indicates two bits carried by the selected PUCCH resource and is modulated according to a QPSK scheme. For instance, when a UE decodes four data units successfully, the UE transmits (1, 1) to a BS through the PUCCH resource associated with $n^{(1)}_{PUCCH,1}$. Since combinations of PUCCH resources and QPSK symbols cannot represent all of available ACK/NACK, NACK and DTX are coupled to each other except in some cases (NACK/DTX, N/D).

FIG. 11 illustrates an A/N timing applied to a CC according to UL-DL configuration #1. In FIG. 11, SFs #0 to #9, and SFs #10 to #19 correspond to radio frames. The numeral in a box denotes a UL subframe associated with a DL subframe in terms of the DL subframe. For example, ACK/NACK for a PDSCH of SF #5 is transmitted in SF #5+7 (=SF #12), and ACK/NACK for a PDSCH of SF #6 is transmitted in SF #6+6 (=SF #12). That is, ACK/NACK for SF #5/SF #6 is transmitted in SF #12. Similarly, ACK/NACK for a PDSCH of SF #14 is transmitted in SF #14+4 (=SF #18).

Figure 12:
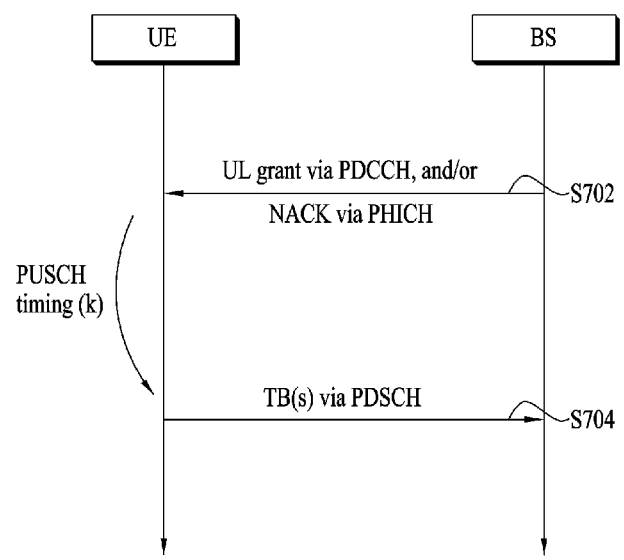
FIGS. 12 and 13 illustrate a PHICH/UG-PUSCH (UL grant Physical Uplink Shared Channel) timing.
Figure 13:
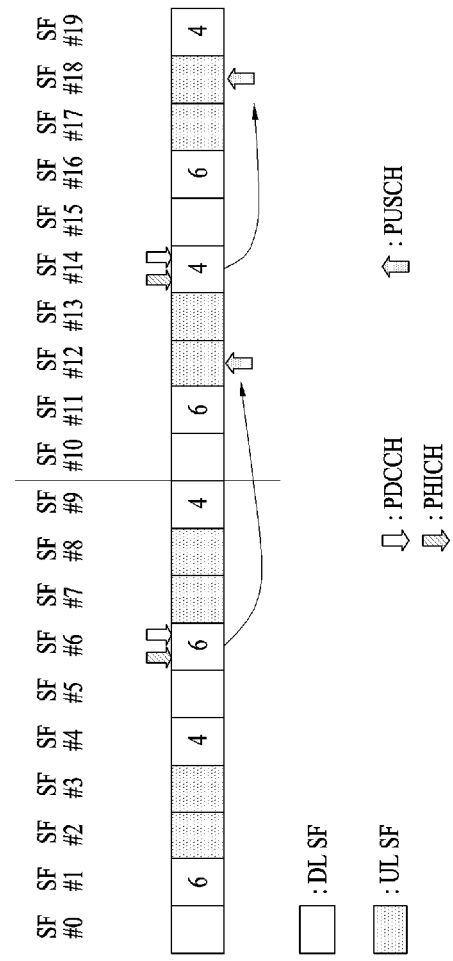

FIGS. 12 and 13 illustrate PHICH/UL grant (UG)-PUSCH timing. A PUSCH can be transmitted corresponding to a PDCCH (UL grant) and/or a PHICH (NACK).

Referring to FIG. 12, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 14 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k. In the FDD, UAI (referred to as k) is set to 4.

TABLE 14

| TDD UL-DL Configuration | saframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | 4 | | | | | 4 | | |
| 3 | 4 | | | | | | | 4 | 4 | |
| 4 | | | | | | | | 4 | 4 | |
| 5 | | | | | | | | 4 | | |
| 6 | 7 | 7 | | | | | 7 | 7 | | 5 |

FIG. 13 illustrates PUSCH transmission timing when UL-DL configuration #1 is configured. In the figure, SF#0 to #9 and SF#10 to #19 respectively correspond to radio frames, and numerals in blocks denote UL subframes relating to DL subframes. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 14:
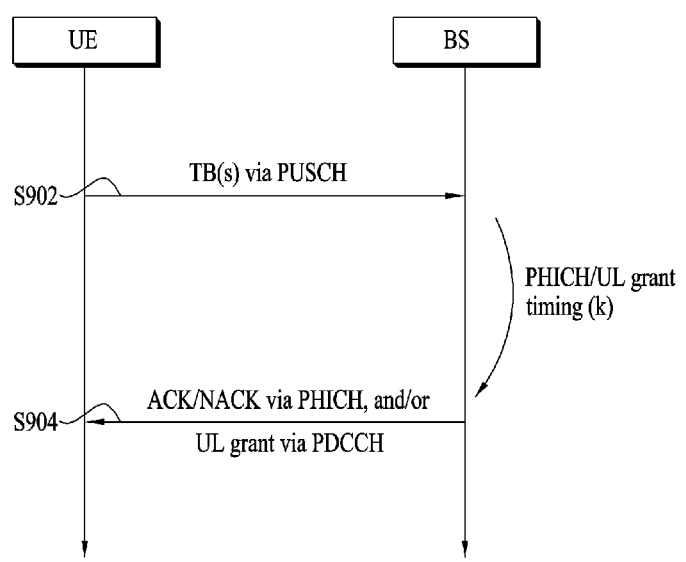
FIGS. 14 and 15 illustrate a UG (UL grant)/PHICH timing.
Figure 15:
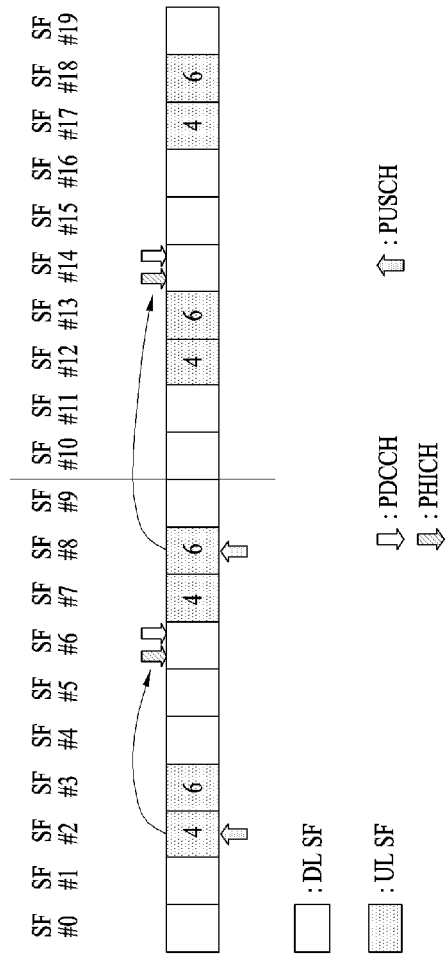

FIGS. 14 and 15 illustrate UL grant (UG)/PHICH timing. A PHICH is used to transmit DL ACK/NACK. Here, DL ACK/NACK means ACK/NACK transmitted on downlink as a response to UL data (e.g. PUSCH).

Referring to FIG. 14, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 15 shows a PHICH timing defined in the TDD. For PUSCH transmission in subframe #n, a UE determines a corresponding PHICH resource in subframe #(n+kPHICH). In the FDD, kPHICH=4.

TABLE 15

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 15 illustrates UL grant/PHICH transmission timing when UL-DL configuration #1 is configured. In the figure, SF#0 to #9 and SF#10 to #19 respectively correspond to radio frames, and numerals in blocks denote DL subframes relating to UL subframes. For example, a UL grant/PHICH corresponding to a PUSCH of SF#2 is transmitted in SF#2+4 (=SF#6) and a UL grant/PHICH corresponding to a PUSCH of SF#8 is transmitted in SF#8+6 (=SF#14).

Figure 16:
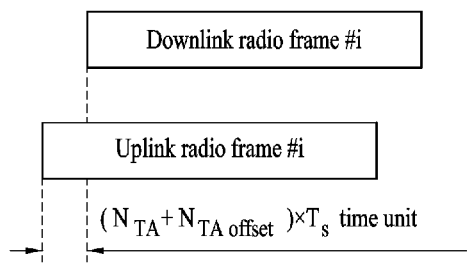
FIG. 16 illustrates an uplink-downlink frame timing relationship.

FIG. 16 illustrates an uplink-downlink frame timing relationship.

Referring to FIG. 16, transmission of uplink radio frame i is started $(N_{TA}+N_{TAoffset})*T_s$ seconds prior to transmission of a downlink radio frame corresponding thereto. In the LTE system, $N_{TA}$ is greater than 0 and less than $2051^2$ ($0 \leq N_{TA} \leq 20512$). Moreover, in the FDD, $N_{TAoffset}$ is set to 0 ($N_{TAoffset}=0$) and in the TDD, $N_{TAoffset}$ is set to 624 ($N_{TAoffset}=624$). $N_{TAoffset}$ is a value previously informed between a BS and a UE. When $N_{TA}$ is indicated through a timing advance command during a random access procedure, the UE adjusts a transmission timing of a UL signal (e.g. PUCCH/PUSCH/SRS) through the above expression. The UL transmission timing is set to a multiple of 16 Ts. The timing advance command indicates a change in the UL timing with reference to the current UL timing. The timing advance command $T_A$ in the random access response is 11-bits. $T_A$ indicates a value between 0, 1, 2, . . . , 1282 and the timing adjustment value $N_{TA}$ is given as $N_{TA}$=TA*16. In other cases, $T_A$ is 6-bits and indicates a value between 0, 1, 2, . . . , 63. The timing adjustment value $N_{TA}$ is given as $N_{TA,new}=N_{TA,old}+(T_A-31)*16$. The timing advance command received in a subframe n is applied from a subframe (n+6). In the case of FDD, a transmission timing of a UL subframe n is advanced with reference to the start point of a DL subframe n as shown in the drawing. In the case of TDD, a transmission timing of a UL subframe n is advanced with reference to the end point of a DL subframe (n+1) (not shown in the drawing).

Figure 17:
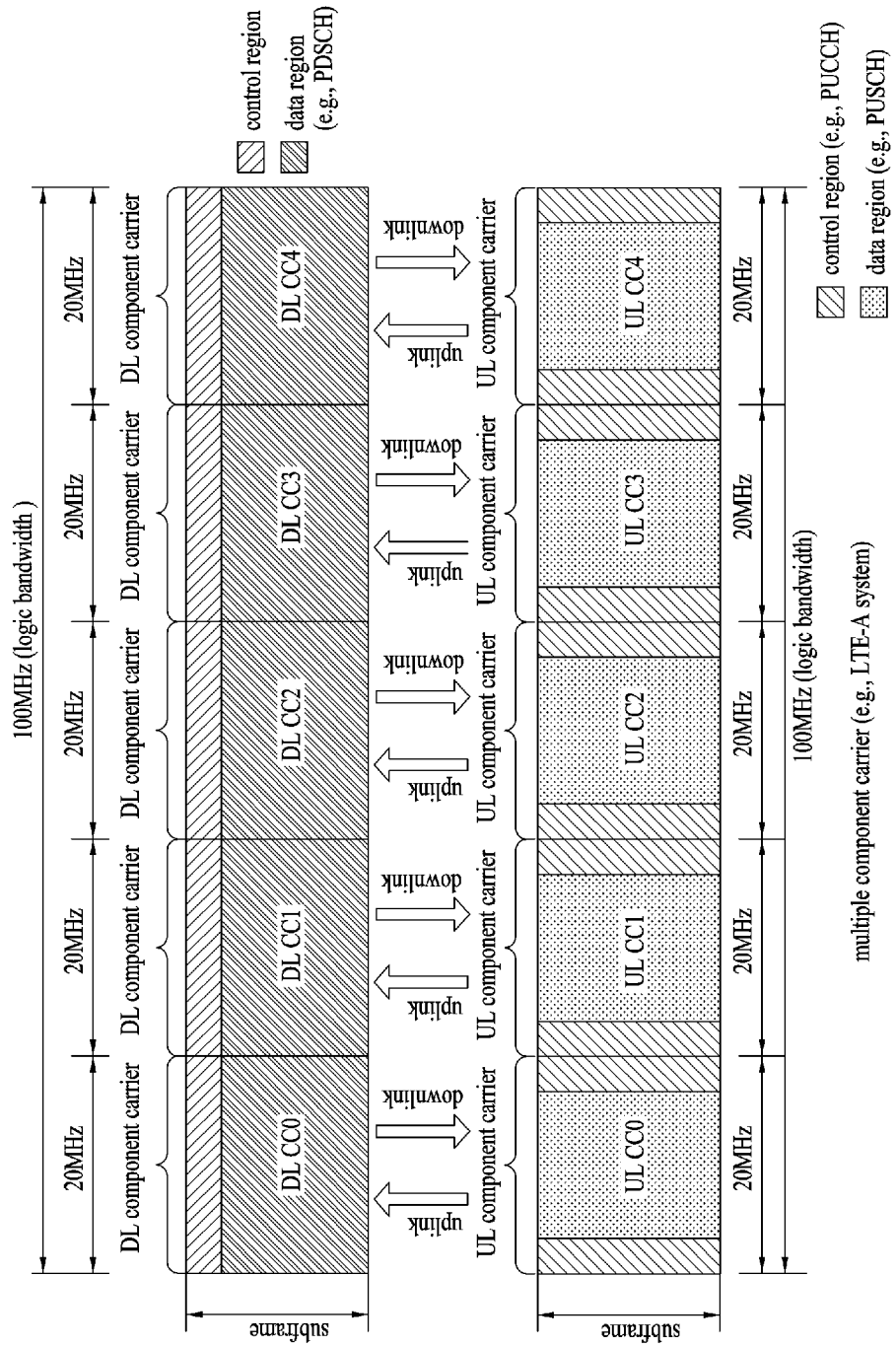
FIG. 17 illustrates a carrier aggregation (CA)-based wireless communication system.

FIG. 17 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 17, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be configured cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of DL resources and UL resources. Yet, the UL resources are not mandatory. Therefore, a cell may be composed of DL resources only or both DL resources and UL resources. The linkage between the carrier frequencies (or DL CCs) of DL resources and the carrier frequencies (or UL CCs) of UL resources may be indicated by system information when CA is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and one or more SCells, for a UE in an RRC_CONNECTED state, for which CA is set.

When a plurality of CCs is configured, cross-CC scheduling and non-cross-CC scheduling may be used. Non-cross-CC scheduling corresponds to scheduling in LTE. When cross-CC scheduling is applied, a DL grant PDCCH may be transmitted on DL CC#0 and a PDSCH corresponding thereto may be transmitted on DL CC#2. Similarly, a UL grant PDCCH may be transmitted on DL CC#0 and a PUSCH corresponding thereto may be transmitted on DL CC#4. For cross-CC scheduling, a carrier indicator field (CIF) is used. Presence or absence of a CIF in a PDCCH may be semi-statically and UE-specifically (or UE-group-specifically) configured through higher layer signaling (e.g. RRC signaling).

Scheduling according to the CIF may be arranged as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS may allocate a monitoring DL CC to reduce blind detection complexity of the UE. For PDSCH/PUSCH scheduling, the UE may detect/decode a PDCCH only on the corresponding DL CCs. In addition, the BS may transmit a PDCCH only through the monitoring DL CC (set). The monitoring DL CC set may be UE-specifically, UE-group-specifically or cell-specifically configured.

Figure 18:
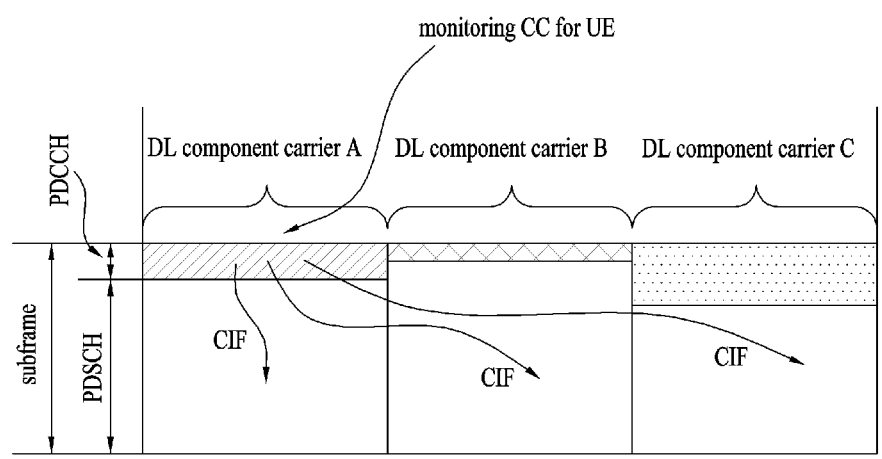
FIG. 18 illustrates a scheduling method when a plurality of cells is configured.

FIG. 18 illustrates cross-carrier scheduling. While the figure shows DL scheduling, cross-carrier scheduling is equally applied to UL scheduling.

Referring to FIG. 18, 3 DL CCs are configured for a UE, and DL CC A may be set as a PDCCH monitoring DL CC. When the CIF is disabled, each DL CC can transmit only a PDCCH that schedules a PDSCH corresponding to the DL CC without a CIF according to LTE PDCCH rule. When the CIF is enabled, DL CC A (i.e. MCC) can transmit not only a PDCCH that schedules the PDSCH corresponding to the DL CC A but also PDCCHs that schedule PDSCHs of other DL CCs using the CIF. In this case, a PDCCH is not transmitted in DL CC B/C.

Here, a specific CC (or cell) used to transmit scheduling information (e.g. PDCCH) is referred to as "monitoring CC (MCC)" which may be replaced by "monitoring carrier", "monitoring cell", "scheduling carrier", "scheduling cell", "scheduling CC", etc. A DL CC on which a PDSCH corresponding to a PDCCH is transmitted and a UL CC on which a PUSCH corresponding to a PUCCH is transmitted may be referred to as a scheduled carrier, a scheduled CC, a scheduled cell, etc. One or more scheduling CCs may be configured per UE. A scheduling CC may include a PCC. When only one scheduling CC is configured, the scheduling CC may be the PCC. The scheduling CC may be UE-specifically, UE-group-specifically or cell-specifically set.

In case of cross-CC scheduling, signal transmission may be performed as follows.

PDCCH (UL/DL grant): scheduling CC (or MCC)

PDSCH/PUSCH: CC indicated by a CIF of a PDCCH detected from a scheduling CC

DL ACK/NACK (e.g. PHICH): scheduling CC (or MCC) (e.g. DL PCC)

UL ACK/NACK (e.g. PUCCH): UL PCC

In the following description, DL ACK/NACK may be referred to as DL A/N or PHICH and UL ACK/NACK may be referred to as UL A/N or A/N for convenience.

In case of a TDD-configured cell, the following problem may occur when a UE transmits an ACK/NACK signal to a BS. Particularly, when the UE has missed a part of PDCCH(s) transmitted by the BS in a period of a plurality of subframes, the UE does not even know that a PDSCH corresponding to the missed PDCCH was transmitted to the UE, whereby an error may occur in generating ACK/NACK.

To solve the above problem, a DL grant PDCCH/SPS release PDCCH for a TDD CC includes a DAI field (i.e., DL DAI field). The value of the DL DAI field indicates a cumulative value (i.e., counting value) of PDCCH(s) corresponding to PDSCH(s) and PDCCH(s) indicating downlink SPS release to the current subframe within DL subframe(s) n-k (where k∈K). For example, if three DL subframes correspond to one UL subframe, PDSCHs transmitted in a period of the three DL subframes are sequentially indexed (i.e., sequentially counted) and the index (or count) is transmitted on a PDCCH for scheduling the PDSCHs. By checking DAI information of the PDCCH, the UE may determine whether a previous PDCCH is appropriately received.

Hereinafter, a method of determining an ACK/NACK transmission resource in case of L-PDCCH based scheduling will be described. When PUCCH format 1a/1b (hereinafter referred to as PF1) is configured for A/N transmission, an ACK/NACK transmission resource for DL data scheduled by a DL grant L-PDCCH can be determined as a PUCCH resource linked to a specific ECCE index (e.g., minimum ECCE index) constituting the DL grant L-PDCCH (implicit PUCCH resource). Specifically, in the LTE/LTE-A, a PF1 resource index is determined as follows.

$$n^{(1)}PUCCH = nCCE + N^{(1)}PUCCH \quad \text{[Equation 31]}$$

Where, $n^{(1)}_{PUCCH}$ indicates a resource index of PF1 for ACK/NACK/DTX transmission, $N^{(1)}_{PUCCH}$ indicates a signaling value received from a higher layer (e.g., radio resource control (RRC)), and $N_{CCE}$ indicates a smallest value among CCE indices used for L-PDCCH transmission. CS (cyclic shift), OC (orthogonal code) and PRB (physical resource block) for PF1 are obtained from $n^{(1)}_{PUCCH}$.

When PUCCH format 3 (hereinafter abbreviated as PF3) is configured for A/N transmission, a specific PF3 resource index among a plurality of PF3 resource indices ($n^{(3)}_{PUCCH}$) allocated by a higher layer (e.g., RRC) can be indicated by an ARI (ACK/NACK resource indicator) value of the DL grant L-PDCCH (explicit PUCCH resource). The ARI is transmitted through a TPC field of an L-PDCCH that schedules a PDSCH of an SCell. OC and PRB for PF3 are obtained from $n^{(3)}_{PUCCH}$.

Even in case of EPDCCH based scheduling, an ACK/NACK transmission resource for DL data scheduled by a DL grant EPDCCH can be determined as a PUCCH resource linked to a specific ECCE index (e.g., minimum ECCE index) constituting the DL grant EPDCCH or a PUCCH resource linked to an ECCE index obtained by adding a specific offset value to the specific ECCE index. In addition, an ACK/NACK feedback transmission resource can also be determined as the PUCCH resource linked to the specific ECCE index (e.g., minimum ECCE index) constituting the DL grant EPDCCH or the PUCCH resource linked to the ECCE index obtained by adding the specific offset value to the specific ECCE index. Here, the specific offset value can be determined by a value, which is directly signaled through an ARO (ACK/NACK resource offset) field in the DL grant EPDCCH and/or a value designated per AP (antenna port). Specifically, information signaled through the TPC field and the ARO field in the DL grant EPDCCH according to the frame structure type (e.g., FDD or TDD) and the A/N feedback transmission scheme (e.g., PF3 or CHsel) can be configured as follows. For convenience, a TPC command for PUCCH power control is defined as "TPC value", an offset value added when an implicit PUCCH index is determined is defined as "ARO value", and an ARI indicating a specific one of a plurality of PF3 indices or a plurality of PF1 indices (groups) allocated through RRC is defined as "ARI value". In addition, a fixed value (e.g., "0") that is inserted (for virtual CRC or the like) without containing no information is defined as "fixed value".

1) FDD with PF3
   A. TPC field
      i. DL grant for scheduling PCell: TPC value
      ii. DL grant for scheduling SCell: ARI value
   B. ARO field
      i. DL grant for scheduling PCell: ARO value
      ii. DL grant for scheduling SCell: Fixed value
2) FDD with CHsel
   A. TPC field
      i. DL grant for scheduling PCell: TPC value
      ii. DL grant for scheduling SCell: ARI value
   B. ARO field
      i. DL grant transmitted through PCell: ARO value
      ii. DL grant transmitted through SCell: Fixed value
3) TDD with PF3
   A. TPC field
      i. DL grant for scheduling PCell: TPC value
      ii. DL grant for scheduling SCell: ARI value
   B. ARO field
      i. DL grant, which corresponds to DAI=1, for scheduling PCell: ARO value
      ii. DL grant, which does not correspond to DAI=1, for scheduling PCell: ARI value
      iii. DL grant for scheduling SCell: Fixed value
4) TDD with CHsel
   A. TPC field
      i. DL grant for scheduling PCell: TPC value
      ii. DL grant for scheduling SCell: ARI value
   B. ARO field
      i. DL grant transmitted through PCell: ARO value
      ii. DL grant transmitted through SCell: Fixed value Meanwhile, not only aggregation of a plurality of CCs with the same SF configuration but also aggregation of a plurality of CCs with different SF configurations can be implemented. For instance, the aggregation of a plurality of CCs with different SF configurations includes aggregation of a plurality of CCs configured with different UL-DL configurations (for convenience, referred to as different TDD CA) and aggregation of TDD CCs and FDD CCs.

In a next-generation system beyond 3GPP LTE(-A) (beyond LTE-(A) system), a low-cost/low-specification UE based on data communication such as meter reading, water level measurement, use of a surveillance camera, and inventory reporting of a vending machine is considered. Hereinafter, such a UE is referred to as an MTC device or an MTC UE. Since less data is transmitted by the MTC UE and many MTC UEs operate in one cell, if signal transmission for UL/DL scheduling/feedback is performed for each MTC UE at every moment, eNB overhead remarkably increases. In particular, if transmissions of UL data/feedback performed by the MTC UE are intermittent and not persistent, an eNB cannot persistently maintain UL time/frequency synchronization of the MTC UE. Therefore, for power saving of the MTC UE, it is desirable to perform UL data/feedback transmission by the MTC UE according to a random access preamble based RACH procedure.

Meanwhile, a situation in which a plurality of MTC UEs that perform the same/similar functions in a coverage-limited space such as a specific building or warehouse are deployed/operated may be considered. Hereinafter, a plurality of MTC UEs that perform the same/similar functions in a coverage-limited space will be referred to as an MTC group. The MTC group may be implemented to intermittently transmit low volumes of data. Particularly, in the case of UL synchronization, since the MTC UEs are adjacent to each other in a coverage-limited space, there is a high probability that UEs that belong to the same MTC group have similar time/frequency synchronization.

Since an MTC UE is used to transmit less data and perform occasionally generated UL/DL data transmission/reception, it is efficient to lower the cost of the UE and reduce battery consumption according to the low data transmission rate. In addition, the MTC UE has low mobility and, therefore, a channel environment thereof rarely changes. Meanwhile, in consideration of up to a poor situation in which the MTC UE is installed in a coverage-limited place such as a basement as well as a building or a factory, various coverage enhancement schemes including a repetitive transmission method for the MTC UE with respect to each channel/signal have been discussed.

Figure 19:
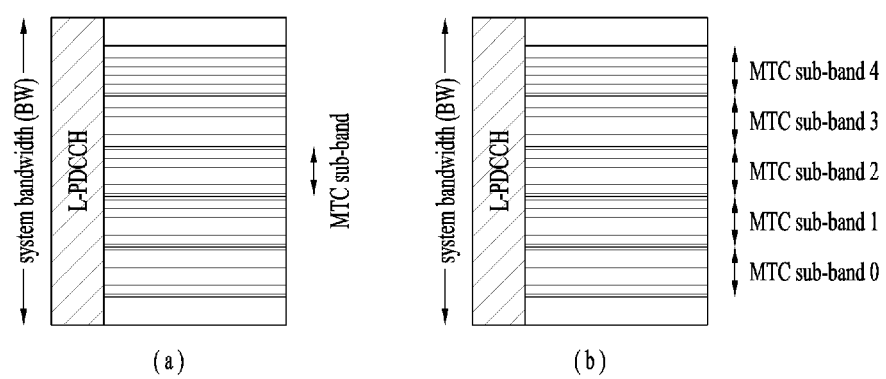
FIG. 19 illustrates a system BW region or a subband region for an MTC UE.

As technology for a low-cost/low-specification UE, decrease in the number of reception antennas, decrease in a maximum transport block (TB) size, reduction in the operating frequency bandwidth (BW) of the UE, and the like, may be considered. In particular, reduction of the operating BW of the UE may be implemented such that the MTC UE can perform a signal transmission/reception operation only with respect to a predetermined BW (e.g. 1.4 MHz or 6 RBs) narrower than an actual system BW (e.g. 20 MHz or 100 RBs) in terms of radio frequency (RF) and/or baseband (BB) signal processing. If a minimum of 6 RBs is used for the system BW of the MTC UE, the MTC UE can advantageously discover/detect a cell that the MTC UE is to access by receiving and/or detecting a legacy PSS/SSS/PBCH. FIG. 19 is a diagram for a system BW or sub-band region for the MTC UE.

Referring to FIG. 19, PDCCH (hereinafter, legacy PDCCH) is transmitted on the whole band, whereas a signal for an MTC UE can be transmitted on a subband region corresponding to a part of the whole band. In this case, as shown in FIG. 19 (a), the subband region in which the MTC UE operates may correspond to a center region (e.g., center 6 PRBs) of a cell all the time. Or, as shown in FIG. 19 (b), it may be able to configure a plurality of subbands for the MTC UE for multiplexing between MTC UEs in a subframe. In this case, it may be able to use a different subband between UEs. Or, it may use a different subband instead of the center 6 PRBs while an identical subband is used between UEs.

Meanwhile, in a legacy system, in the case of various DL control channels (e.g. a PCFICH and a PHICH) including a PDCCH, as mentioned in the foregoing description, REs/REGs/CCEs constituting the control channels are transmitted over/throughout an entire system BW through a series of procedures such as interleaving and cyclic shift. When the UE needs to receive the control channel based on an entire system band of a connected RF, it is difficult to implement the UE with low-cost/low-specification. If the MTC UE is configured by the subband, the MTC UE is unable to properly receive legacy PDCCH transmitted via the whole system band. If PDCCH for the MTC UE is transmitted in an OFDM symbol region in which the legacy PDCCH is transmitted due to a multiplexing issue with PDCCH transmitted to a different UE, it is not preferable.

As a solution for this, it is necessary to introduce a control channel which is transmitted in a sub-band in which MTC is operating for the MTC UE. In order to introduce a downlink control channel for the low-complexity MTC UE, it may use legacy EPDCCH as it is or it may be able to introduce a control channel corresponding to a variation of the legacy EPDCCH. In the present invention, a physical downlink control channel introduced for the low-complexity MTC UE or a normal complexity MTC UE is commonly referred to as EPDCCH. For the same reason, a physical downlink control channel transmitted to the MTC UE is also restricted to a sub-band received by a UE.

The present invention is explained under the assumption that a corresponding sub-band or a narrow band is set to a UE in advance. In other word, the present invention is explained under the assumption that the UE knows a sub-band set to the UE. The sub-band set to the UE can be changed into a different sub-band instead of being fixed.

The present invention is explained under the assumption that signal transmission and reception proposed by the present invention is used for the MTC UE. Yet, it is apparent that the present invention can also be applied to a case of using the signal transmission and reception for a different general UE rather than the MTC UE.

In a subframe, a low-complex MTC UE capable of transmitting and receiving a signal via a sub-band only among the entire system band (i.e., LC-MTC UE) and a general UE capable of transmitting and receiving a signal via the entire system band (i.e., normal UE) can be connected with a network in a manner of being mixed. Since the number of LC-MTC UEs, the number of normal UEs, and traffic load vary depending on a cell and a system, it is important to efficiently distribute and manage resources between the UEs. Since the normal UE is able to transmit and receive a signal via the entire bands, a channel transmitted by the UE in a specific subframe may correspond to a random RB. On the contrary, since the LC-MTC UE is able to transmit and receive a signal via a specific subband only, all signals transmitted in a specific subframe should be restricted to a specific subband.

In particular, in case of PUCCH transmitted to an eNB by a UE to forward various control signals, since the degree of freedom of dynamically allocating a resource is low, it is necessary to minimize resource waste through an efficient design. In the following, a method of efficiently making PUCCH transmitted by a normal UE and PUCCH transmitted by an LC-MTC UE coexist is proposed. In this case, a PUCCH transmission resource transmitted by the normal UE can be determined according to what is mentioned in the foregoing description.

For clarity, a general (normal) UE is referred to as an (N-)UE or a first type UE. And, (N-)PUCCH for the N-UE is referred to as a first type PUCCH. Or, since the (N-)PUCCH corresponds to a legacy PUCCH, the (N-)PUCCH can also be simply referred to as PUCCH. In the following, the LC-MTC UE is referred to as an M-UE or a second type UE and PUCCH for the M-UE is referred to as M-PUCCH or a second type PUCCH.

PUCCH transmission or N-PUCCH transmission of the N-UE is summarized in the following. One PUCCH obtains frequency diversity by converting an RB (resource block) which is used between two slots constructing a subframe. A plurality of PUCCHs are CDM (code division multiplexing) in an RB via a combination of CSs/OCCs different from each other.

In order to make the N-PUCCH and the M-PUCCH efficiently coexist, it is necessary to modify resource allocation of the M-PUCCH. This is because a transmission resource of the M-UE is restricted to a single sub-band in a subframe due to the aforementioned reason and the M-PUCCH is unable to perform frequency hopping between slots, i.e., slot hopping, unlike the slot hopping performed in the N-UE. In this case, if the M-UE performs slot hopping in a limited sub-band, it may unnecessarily break a frequency resource of the sub-band while failing to obtain frequency diversity gain. As a result, it may interrupt the use of a different channel. Hence, it may be able to configure the M-UE not to perform the slot hopping. As a result, it may be difficult to make PUCCH of the N-UE performing the slot hopping and the M-PUCCH not performing the slop hopping coexist in the same RB region. FIG. 20 shows the abovementioned situation and explains an N-PUCCH resource and an M-PUCCH resource in a subframe.

In FIG. 20, a situation capable of performing CDM on 12 PUCCHs in an RB is assumed. Numbers shown in FIG. 20 correspond to PUCCH resource indexes in the aspect of the N-UE. In this case, the PUCCH resource indexes are CDM to an RB in a unit of 12. If slot hopping is performed and an RB is changed, the same 12 PUCCH resource indexes are CDM to the changed RB. Of course, an OCC and a CS used by each of the resource indexes are changed according to the aforementioned method.

If a specific M-UE uses a PUCCH resource index 23 (or, PUCCH index 23) of an N-UE in a first slot, the M-UE is unable to use the PUCCH resource index 23 in a second slot. The M-UE should use one selected from among PUCCH indexes 0 to 11. In particular, one M-UE PUCCH transmission consumes two PUCCH resources of the N-UE. For example, if the M-UE uses a resource of an index 11 in the second slot, the N-UE is unable to use both the PUCCH resource of the index 11 and the PUCCH resource of the index 23.

In the following, a method for solving the abovementioned problem is explained through various embodiments. Although each of the embodiments can be independently utilized, two or more embodiments can be utilized in a manner of being combined with each other to more increase resource utilization. In the following description, although it is assumed that the M-UE transmits PUCCH to the same PRB in two slots, by which the present invention may be non-limited. The method can also be applied to a case that a plurality of PRBs belonging to a subband is configured as a PRB group and PUCCH of the M-UE is transmitted to the same PRB group in two slots.

Embodiment—PUCCH Resource Allocation/Transmission for M-UE

Method 1—Method of Separately Designating PUCCH Resource Index to be Used in Each Slot An eNB can separately designate a PUCCH resource index to be used by an M-UE in each slot via a higher layer signal such as RRC and/or a physical layer signal such as PDCCH. For clarity, the PUCCH resource index to be used by the M-UE is referred to as an M-PUCCH resource index.

In case of using a higher layer signal, for example, when the eNB designates a resource of a PUCCH format 2 for reporting periodic CSI, the eNB can separately designate a PUCCH resource index to be used in each slot. In this case, the eNB determines a resource used by PUCCH of an N-UE performing slot hopping, selects two resources not collided with each other in each slot, and allocates the resources as an M-PUCCH resource.

Specifically, it may have a restriction that the two resources, which are designated as one M-PUCCH resource, should belong to the same sub-band all the time. More specifically, it may have a restriction that the two resources should become a resource located at the same PRB pair.

Referring back to FIG. 20, for example, if resources of indexes 0 to 5 are used as PUCCH of the N-UE, the eNB can designate a resource of an index 6 of a first slot and a resource of an index 18 of a second slot as one M-PUCCH resource to make the resources not to be collided with the M-PUCCH resource.

In this case, a resource used in a second slot can be designated in a manner of applying a prescribed offset to an index of a resource used in the first slot. The offset is applied to be positioned in the same PRB pair and modulo calculation is performed on the number of PUCCH resources per PRB to prevent a corresponding index from moving to a different PRB pair.

As mentioned in the following description, a concept of using the modulo calculation is helpful when a resource index is reconfigured. For example, as shown in FIG. 22, when resource indexes of the same range are designated in an RB of the same frequency of a first slot and a second slot, the concept of using the modulo calculation is helpful.

In case of using a physical layer signal, for example, when an eNB transmits HARQ-ACK in response to PDSCH via (E)PDCCH scheduling the PDSCH, the eNB can designate a resource for transmitting the HARQ-ACK according to a slot. In this case, the eNB can designate an M-PUCCH resource not collided with PUCCH of an N-UE in every subframe.

In this case, an index of an M-PUCCH resource to be used in a second slot can be determined through two steps described in the following. First of all, a prescribed set (i.e., a candidate set) induced from an M-PUCCH resource index used in a first slot is determined and one index is selected from the set via (E)PDCCH.

In particular, it may set a limit that the set induced from the M-PUCCH resource index used in the first slot becomes an M-PUCCH resource belonging to the same sub-band and/or the same PRB pair.

Referring back to FIG. 20, for example, if it is determined to use a resource of an index 6 in a first slot, resources of indexes 12 to 23 corresponding to resources mapped to the same PRB pair to which the resource of the index 6 is mapped are designated as the candidate set in a second slot and a resource is selected from the candidate set via the (E)PDCCH.

As a variation of the method, an M-PUCCH resource index to be used in the first slot can be implicitly determined without separate explicit signaling via the (E)PDCCH. For example, the M-PUCCH resource index to be used in the first slot is implicitly determined through such a parameter as a position (e.g., lowest (E)CCE index) of a transmission resource of the (E)PDCCH, whereas a resource index to be used in the second slot can be determined via separate explicit signaling via the (E)PDCCH. In this case, the signaling signaled via the (E)PDCCH may have a form of an offset value to the M-PUCCH resource index to be used in the second slot on the basis of a PUCCH resource index used in the first slot.

Moreover, if it is necessary for an M-UE to repeatedly transmit the same M-PUCCH in a plurality of subframes for coverage enhancement, it may be able to separately designate an M-PUCCH transmission resource in each of a plurality of the subframes.

In this case, in order to obtain maximum flexibility, it may be able to designate an M-PUCCH resource to be used in each subframe and/or slot.

Or, in order to reduce signaling overhead caused by the abovementioned scheme, prescribed subframes and/or slots are grouped and a PUCCH resource to be used for the group can be designated. For example, when a UE repeatedly transmits M-PUCCH in 10 subframes, i.e., 20 slots, an eNB may be able to designate 4 M-PUCCH resources in total to inform the UE that it is able to use the resources in the first, the second, the third, and the fourth M-PUCCH transmission slot. Moreover, the use of the resources can be repeated by 5 times in total. In particular, the 20 slots are alternately grouped by 4 groups in total and an M-PUCCH resource to be used in each group is designated. In other word, modulo calculation is performed on each slot number using 4 and slots of the same result value can be grouped together. Or, each of the slot numbers is divided by 4 and slots of the same remaining value can be grouped together.

Method 2: Resource Re-Indexing Method for LC-MTC PUCCH

The present invention proposes a method for an M-UE not to perform slot hopping. In particular, the present invention propose a method for the M-UE to perform new indexing instead of using an N-PUCCH resource index as an M-PUCCH resource index to be used by the M-UE.

When the method 2 is performed, contents regarding the resource configuration mentioned earlier in the method 1 can be applied to the method 2. For example, an eNB may set a PUCCH resource to an M-UE via higher layer signaling or physical layer signaling. In this case, it may utilize a re-indexed M-PUCCH resource index.

FIG. 21 illustrates an example of assigning a PUCCH resource index for M-PUCCH according to one embodiment of the present invention.

Referring to FIG. 21, an index separate from N-PUCCH can be assigned to a PUCCH resource for M-PUCCH. This can be referred to as re-indexing. In particular, the M-PUCCH can be configured to have a separate resource index.

In the aspect of the M-PUCCH, a resource index A can be configured in a manner of being combined with a resource index B of N-PUCCH in a first slot and a resource index C of N-PUCCH in a second slot. As mentioned in the foregoing description, it may be able to regulate the resources B and C (resources of indexes B and C) to be located at the same PRB pair.

For example, it is determined that M-PUCCH uses an N-PUCCH resource of a specific index in a first slot and uses an N-PUCCH resource of a different index located at the same PRB pair in a second slot. If it is able to operate as M-PUCCH in two PRB pairs, for example, it may satisfy B=A+X and C can be determined by equation 32 described in the following.

$$C=A+X+P, \text{ if } (A \bmod 2P)<P \quad \text{[Equation 32]}$$

$$C=A+X-P, \text{ otherwise.}$$

In this case, X corresponds to a space between a start point of the M-PUCCH and a start point of the N-PUCCH and P corresponds to the number of PUCCHs on which CDM is performed according to an RB. In this case, in case of PUCCH formats 1/1a/1b, the P can be represented by equation 33 described in the following.

$$P=c \cdot N_{sc}^{RB}/\Delta_{shift}^{PUCCH} \quad \text{[Equation 33]}$$

In this case, c is identical to what is defined in equation 14. And, $N_{sc}^{RB}$ corresponds to a resource block size in frequency domain and can be represented by the number of subcarriers. As mentioned earlier in equation 14, $\Delta_{shift}^{PUCCH}$ corresponds to a parameter provided by higher layer.

For example, if A corresponds to 0 and X corresponds to 0, N-PUCCH resource index #B of a first slot corresponds to B=0. In this case, C=P is satisfied according to the equation 32. In this case, if the P corresponds to 12, the C is determined by 12. In particular, M-PUCCH resource A corresponds to a resource of N-PUCCH index 0 of a first slot and a resource of N-PUCCH index 12 of a second slot.

A problem may occur when a PUCCH resource selection is fixed by a specific value. For example, an inter-cell interference problem may consistently occur. In order to solve the problem, it may add a prescribed offset to a value of the C determined by the above equation. In this case, of course, it may be able to readjust a result value via modulo calculation to make the C value to which an offset R is added to be positioned at the same PRB. For example, a resource index in a second slot can be given by C'=((C+R) mod P)+floor(C/P). In this case, the offset R may correspond to a fixed value or a value determined by a parameter such as a cell ID and/or a subframe index.

In case of operating according to the example shown in FIG. 21, two N-UE PUCCH resources become unavailable for a single M-UE PUCCH resource, In this case, if the remaining part of the unavailable N-UE PUCCH resources is used for a different M-UE PUCCH, it may be able to increase resource utilization.

Referring back to FIG. 21, for example, if the M-UE uses M-PUCCH resource #0, N-PUCCH resource #0 (M-PUCCH resource #0) of a first slot and N-PUCCH resource #12 (M-PUCCH resource #0) of a second slot are used. In this case, it is preferable to increase a probability of using N-PUCCH resource #12 of the first slot and N-PUCCH resource #0 of the second slot (i.e., M-PUCCH resource #12 shown in FIG. 21) capable of being used by a different M-UE.

In this case, the use probability of the different M-UE can be increased by appropriately designing a method of assigning an index. In general, resources adjacent to each other on PUCCH resource index can be used for the similar usage. In particular, PUCCH resources of a similar value can be used for the similar usage. For example, the same PUCCH format may use an adjacent resource or a UE scheduled by the same or adjacent control resource may use an adjacent resource. Hence, it is preferable to design M-PUCCH index in a manner that two M-PUCCH resources of adjacent indexes influence on the same N-PUCCH resource.

FIG. 22 illustrates a different example of assigning a PUCCH resource index for M-PUCCH according to one embodiment of the present invention.

In the following, a method of assigning an index is explained to enable MTC-UEs to use a resource of a close index among adjacent M-PUCCH indexes. In particular, a method of assigning an index is explained to enable the MTC-UEs to use a resource of a close index by introducing a paring concept between resources.

For example, if M-PUCCH resource of a specific index is designated by pairing N-PUCCH resource M of a first slot with N-PUCCH resource N of a second slot, M-PUCCH resource of a next index can be designated by pairing normal PUCCH resource N of the first slot with normal PUCCH resource M of the second slot. For example, if M-PUCCH #0 is designated by pairing N-PUCCH resources #0 and #12 in a first slot, M-PUCCH #1 can be designated by pairing N-PUCCH resource #12 of a first slot with N-PUCCH resource #0 of a second slot. In case of (a, b), if a corresponds to a resource of a first slot and b corresponds to a resource of a second slot, (N, M) and (M, N) are represented as being paired. In other word, a resource pair of (N, M) may correspond to (M, N). As a result, as shown in FIG. 22, two PRB pairs are alternately indexed or an index is assigned in the aspect of M-PUCCH resource indexes.

A resource pairing method shown in FIG. 22 can be used for the usage of obtaining frequency diversity when M-UE repeatedly transmits the same PUCCH over a plurality of subframes to expand coverage.

In particular, if M-PUCCH resource of a specific index is designated by pairing N-PUCCH resource #M of a first slot with N-PUCCH resource #N of a second slot and a UE hops to a different frequency domain while transmitting PUCCH over a plurality of subframes and maintains the transmission, a PUCCH resource after the hopping may use M-PUCCH resource which is indexed by pairing N-PUCCH resource #N of a first slot with N-PUCCH resource #M of a second slot. Referring to FIG. 22, if M-PUCCH resource #0 is used in a first subframe by pairing N-PUCCH resource #0 with N-PUCCH resource #12, it may use M-PUCCH resource #1 in a second subframe by pairing N-PUCCH resource #12 with N-PUCCH resource #0. As a result, although corresponding M-PUCCH is repeatedly transmitted, unavailable N-PUCCH resources are always fixed by the same two resources and the remaining resources are not affected. Hence, an eNB can freely use the resources.

Meanwhile, in case of N-PUCCH, as shown in FIG. 23, PUCCH format 1/1a/1b and PUCCH format 2/2a/2b may appear at the same time in a specific PRB pair. In FIG. 23, a PRB pair where m corresponds to 2 and 3 corresponds to the specific PRB pair.

FIG. 23 illustrates a further different example of assigning a PUCCH resource index for M-PUCCH according to one embodiment of the present invention.

In this case, in the aspect of M-PUCCH format 1/1a/1b occupying the same PRB pair, a situation of being CDM with two formats different from each other may occur. In the situation, it is more difficult to avoid a collision with N-PUCCH. In order to prevent the collision, it may be able to configure PUCCH format 1/1a/1b to start from a PRB pair (m=4, 5 in FIG. 23) where PUCCH format 2/2a/2b does not appear over two slots.

Referring back to FIG. 23, for example, it may be able to comprehend as indexing of the M-PUCCH format 1/1a/1b starts from a PRB pair where m corresponds to 4 and 5. In this case, equation 33 mentioned earlier with reference to FIG. 21 can be changed to equation 34 described in the following. Specifically, in the aspect of normal PUCCH, it may add a prescribed offset. In particular, PUCCH format 1/1a/1b may appear in a PRB pair only from N-PUCCH having an index of the offset.

$$B = A + X + \text{offset} \quad [\text{Equation 34}]$$

$$C = A + X + P + \text{offset}, \text{ if } (A \bmod 2P) < P$$

$$C = A + X - P + \text{offset}, \text{ otherwise}$$

In this case, the offset corresponds to a minimum value that enables normal PUCCH format 1/1a/1b to appear in the same PRB pair of a different slot among indexes of the normal PUCCH format 1/1a/1b. The offset can be defined as equation 35 described in the following.

$$\text{offset} = \begin{cases} c \cdot N_{cs}^{(1)}/\Delta_{shift}^{PUCCH} & \text{if } N_{RB}^{(2)} \bmod 2 = 1 \\ c \cdot N_{cs}^{(1)}/\Delta_{shift}^{PUCCH} + c \cdot N_{sc}^{RB}/\Delta_{shift}^{PUCCH} & \text{otherwise} \end{cases} \quad [\text{Equation 35}]$$

In this case, each of parameters is defined to determine a PUCCH resource of the N-UE. In particular, c is identical to what is defined in equation 14. And, $N_{sc}^{RB}$ corresponds to a resource block size in frequency domain and can be represented by the number of subcarriers. As mentioned earlier in equation 14, $\Delta_{shift}^{PUCCH}$ corresponds to a parameter provided by a higher layer. $N_{cs}^{(1)}$ corresponds to the number of cyclic shift values, which are used for PUCCH format 1/1a/1b in a resource block where format 1/1a/1b and format 2/2a/2b are mixed. $N_{RB}^{(2)}$ corresponds to a bandwidth represented by a resource block capable of being used by PUCCH forma 2/2a/2b in a slot.

In case of applying the abovementioned principle to the M-PUCCH resource indexing shown in FIG. 22, it may be able to firstly perform the M-PUCCH resource indexing according to the above equation and may be then able to perform index permutation in a manner of changing FIG. 21 to FIG. 22.

Method 3: Interworking Method with LC-MTC Control Signal Resource

If M-PUCCH resource is determined according to the aforementioned methods, each resource (i.e., PUCCH format 1 a/1 b resource) can be interlocked with (E)PDCCH resource. In particular, if (E)PDCCH is transmitted via a specific resource and the (E)PDCCH schedules PDSCH, HARQ-ACK for the PDSCH can be transmitted using a PUCCH resource interlocked with the (E)PDCCH.

In this case, since an amount of resources used by the (E)PDCCH, which is transmitted to M-UE, varies depending on various situations (e.g., current channel state, etc.), it is necessary to configure a specific reference resource unit and interlock PUCCH resource in every reference unit. If more resources are necessary, it may be able to configure (E)PDCCH to be transmitted using a plurality of units at a time.

The reference resource unit can be determined by methods described in the following or a combination thereof.

(1) (E)CCE: The reference resource unit may become a single (E)CCE. This indicates an operation identical to a case of mapping one PUCCH resource to (E)CCE in an operation of N-UE.

(2) Aggregation level (L): The reference resource unit may become a minimum aggregation level defined by a corresponding UE or a corresponding search space. If the minimum aggregation level is applied, it may be able to prevent a case that a plurality of PUCCH resource are mapped to the minimum aggregation level corresponding to a minimum transmission unit and one of a plurality of the PUCCH resources is used only. Assume a case that the minimum aggregation level corresponds to 2. In case of a legacy (E)PDCCH resource, as shown in (1), if a resource is mapped to every (E)CCE although the minimum aggregation level corresponds to 2, it may cause resource waste. Hence, it is necessary to configure a resource to be interlocked with floor (nECCE/2) in consideration of the minimum aggregation level. In particular, it is able to map a PUCCH resource to a unit corresponding to the minimum aggregation level.

(3) Sub-band: The reference resource unit may become a sub-band on which (E)PDCCH is transmitted. This scheme is especially effective when all control channel resources of a single sub-band are utilized for single (E)PDCCH for high coverage extension.

(4) Minimum time section in which (E)PDCCH candidate is repeated: The reference resource unit may become a minimum time section in which (E)PDCCH candidate is repeated. When the same (E)PDCCH is transmitted over a plurality of subframes, if the minimum time section is used, it may be able to prevent a case that PUCCH resources different from each other are interlocked in every subframe and one of the PUCCH resources is used only.

Figure 24:
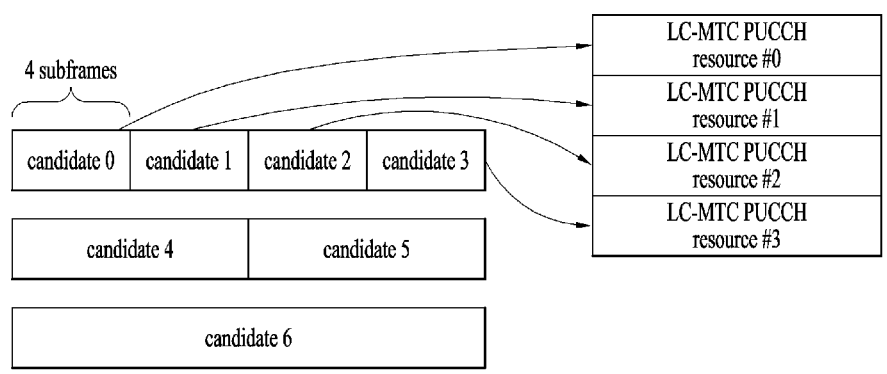
FIG. 24 illustrates an example of interlocking a control signal resource with M-PUCCH according to a different embodiment of the present invention.

FIG. 24 illustrates an example of interlocking a control signal resource with M-PUCCH according to a different embodiment of the present invention. A case corresponding to (4) is explained in detail with reference to FIG. 24. Referring to FIG. 24, a UE searches for four (E)PDCCH candidates repeated in 4 subframes, two candidates repeated in 8 subframes, and one candidate repeated in 16 subframes. In this case, a minimum time section in which (E)PDCCH candidate is repeated corresponds to 4 subframes. Hence, one PUCCH resource is mapped per 4 subframes.

Figure 25:
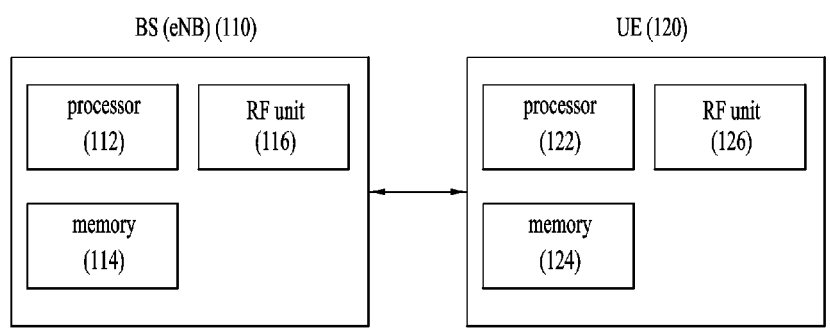
FIG. 25 illustrates a base station and a user equipment applicable to an embodiment of the present invention.

FIG. 25 illustrates a BS and a UE of a wireless communication system, which are applicable to embodiments of the present invention. When the wireless communication system includes a relay, the BS or UE can be replaced by the relay.

Referring to FIG. 25, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'TIE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other apparatuses (e.g. a relay) of a wireless communication apparatus. Specifically, the present invention is applicable to a method for transmitting control information and an apparatus for the same.

What is claimed is:

1. A method of transmitting an uplink signal by a user equipment (UE) via a physical uplink control channel (PUCCH) in a wireless communication system supporting machine type communication (MTC), the method comprising:

receiving information on MTC-PUCCH (M-PUCCH) resources for the MTC from a base station; and transmitting the uplink signal in a first subframe via the M-PUCCH resources based on the information, wherein an index of the M-PUCCH resources correspond to a first index in a first slot of the first subframe and a second index in a second slot of the first subframe, and the first index and the second index do not collide with a PUCCH resource index of a normal UE in the first subframe, and the first index and the second index correspond to indexes of resources positioned at the same physical resource block PRB) pair, and wherein when the information indicates i) the uplink signal is repeatedly transmitted via N slots, ii) the N slots are divided into L groups in a time domain, and iii) L M-PUCCH resources are designated for the L groups respectively, the uplink signal is transmitted via the L M-PUCCH resources in the N slots, where L and N are integers.

2. The method of claim 1, wherein the information on the M-PUCCH resources is signaled via a higher layer signal.

3. A method of receiving an uplink signal by a base station via a physical uplink control channel (PUCCH) in a wireless communication system supporting machine type communication (MTC), the method comprising:
   transmitting information on MTC-PUCCH (M-PUCCH) resources for the MTC to a user equipment (UE); and
   receiving the uplink signal in a first subframe via the M-PUCCH resources based on the information,
   wherein an index of the M-PUCCH resources correspond to a first index in a first slot of the first subframe and a second index in a second slot of the first subframe, and the first index and the second index do not collide with a PUCCH resource index of a normal UE in the first subframe, and the first index and the second index correspond to indexes of resources positioned at the same physical resource block (PRB) pair, and
   wherein when the information indicates i) the uplink signal is repeatedly transmitted via N slots, ii) the N slots are divided into L groups in a time domain, and iii) L M-PUCCH resources are designated for the L groups respectively, the uplink signal is transmitted via the L M-PUCCH resources in the N slots, where L and N are integers.

4. The method of claim 3, wherein the information on the M-PUCCH resources is signaled via a higher layer signal.

5. A user equipment (UE) for transmitting an uplink signal via a physical uplink control channel (PUCCH) in a wireless communication system supporting machine type communication (MTC), the UE comprising:
   a transceiver configured to transmit or receive a signal with a base station; and
   a processor configured to:
      control the transceiver to receive information on MTC-PUCCH (M-PUCCH) resources for the MTC from a base station, and
      control the transceiver to transmit the uplink signal in a first subframe via the M-PUCCH resources based on the information,
   wherein an index of the M-PUCCH resources correspond to a first index in a first slot of the first subframe and a second index in a second slot of the first subframe, and the first index and the second index do not collide with a PUCCH resource index of a normal UE in the first subframe, and the first index and the second index correspond to indexes of resources positioned at the same physical resource block (PRB) pair, and
   wherein when the information indicates i) the uplink signal is repeatedly transmitted via N slots, ii) the N slots are divided into L groups in a time domain, and iii) L M-PUCCH resources are designated for the L groups respectively, the uplink signal is transmitted via the L M-PUCCH resources in the N slots, where L and N are integers.

6. The UE of claim 5, wherein the information on the M-PUCCH resources is signaled via a higher layer signal.

7. A base station for receiving an uplink signal via a physical uplink control channel (PUCCH) in a wireless communication system supporting machine type communication (MTC), the base station comprising:
   a transceiver configured to transmit or receive a signal with a user equipment; and
   a processor configured to:
      control the transceiver to transmit information on MTC-PUCCH (M-PUCCH) resources for the MTC to the user equipment, and
      control the transceiver to receive the uplink signal in a first subframe via the M-PUCCH resources based on the information,
   wherein an index of the M-PUCCH resources correspond to a first index in a first slot of the first subframe and a second index in a second slot of the first subframe, and the first index and the second index do not collide with a PUCCH resource index of a normal UE in the first subframe, and the first index and the second index correspond to indexes of resources positioned at the same physical resource block (PRB) pair, and
   wherein when the information indicates i) the uplink signal is repeatedly transmitted via N slots, ii) the N slots are divided into L groups in a time domain, and iii) L M-PUCCH resources are designated for the L groups respectively, the uplink signal is transmitted via the L M-PUCCH resources in the N slots, where L and N are integers.

8. The base station of claim 7, wherein the information on the M-PUCCH resources is signaled via a higher layer signal.

* * * * *